United States Patent
Sampson et al.

(10) Patent No.: US 11,668,803 B1
(45) Date of Patent: Jun. 6, 2023

(54) FEW-MODE AMPLIFIED RECEIVER FOR LIDAR

(71) Applicant: University of Central Florida Research Foundation, Inc., Orlando, FL (US)

(72) Inventors: Rachel Sampson, Oviedo, FL (US); Alireza Fardoost, Orlando, FL (US); Guifang Li, Orlando, FL (US); He Wen, Oviedo, FL (US); Yuanhang Zhang, Orlando, FL (US); Huiyuan Liu, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 940 days.

(21) Appl. No.: 16/548,644

(22) Filed: Aug. 22, 2019

Related U.S. Application Data

(60) Provisional application No. 62/721,149, filed on Aug. 22, 2018.

(51) Int. Cl.
  *G01S 7/484* (2006.01)
  *G01S 7/481* (2006.01)
  *G01S 17/88* (2006.01)

(52) U.S. Cl.
  CPC ............ *G01S 7/484* (2013.01); *G01S 7/4814* (2013.01); *G01S 7/4817* (2013.01); *G01S 17/88* (2013.01)

(58) Field of Classification Search
  CPC ...... G01S 7/484; G01S 7/4814; G01S 7/4817; G01S 17/88
  USPC ........................................................ 356/5.01
  See application file for complete search history.

(56) References Cited

U.S. PATENT DOCUMENTS

| | | | |
|---|---|---|---|
| 9,563,011 B2 | 2/2017 | Li et al. | |
| 9,823,118 B2 | 11/2017 | Doylend et al. | |
| 9,958,542 B2 | 5/2018 | Kue et al. | |
| 9,958,545 B2 | 5/2018 | Eichenholz et al. | |
| 2017/0153319 A1 | 6/2017 | Villeneuve et al. | |
| 2017/0299900 A1* | 10/2017 | Montoya | G02F 1/0121 |
| 2019/0302266 A9* | 10/2019 | Hall | G01S 17/89 |

OTHER PUBLICATIONS

Behroozpour, Behnam et al., Integrated Circuits for Communications, "Lidar System Architectures and Circuits", IEEE Communications Magazine, Oct. 2017, pp. 135-142.

(Continued)

*Primary Examiner* — Md M Rahman
(74) *Attorney, Agent, or Firm* — Suiter Swantz pc llo

(57) ABSTRACT

A few-mode light detection and ranging (LIDAR) system may include an illumination source to generate an illumination beam, one or more transmission optics to direct at least a portion of the illumination beam within a field of view, one or more collection optics to collect return light from an object in the field of view illuminated by the illumination beam, wherein the collected return light includes a plurality of spatial modes, a few-mode optical amplifier to optically amplify portions of the return light propagating along at least two of the plurality of spatial modes, and a detector configured to convert output light from the few-mode optical amplifier to an output electrical signal.

32 Claims, 14 Drawing Sheets

(56) References Cited

OTHER PUBLICATIONS

Huang, Bin et al., "Turbulence-Resistant Free-Space Optical Communication Using Few-Mode Preamplified Receivers", published in Proc. ECOC 2017, 3 pages.

Li, Guifang et al., "Space-division multiplexing: the next frontier in optical communication", Advances in Optics and Photonics 6, 2014, doi:10.1364/AOP.6.000413, pp. 413-487.

Yung, Y. et al., "First demonstration of multimode amplifier for spatial division multiplexed transmission systems", published in Proc. ECOC 2011, 3 pages.

Zhao, Ningbo et al., "Capacity limits of spatially multiplexed free-space communication", Nature Photonics, vol. 9, Dec. 2015, 7 pages.

He Wen et al., Four-mode semiconductor optical amplifier, APL Photonics 1, Apr. 1, 2016, 070801-1-070801-7, AIP Publishing.

M.H. Al-Mansoori et al., 56.6 dB high gain L-band EDFA utilizing short-length highly-doped erbium rare-earth material, Journal of the European Optical Society—Rapid Publications, vol. 9, 14028, Jul. 22, 2014, pp. 1-4, Europe.

Rachel Sampson et al., Improving the Sensitivity of LiDARs Using Few-Mode Pre-amplified Receivers, in Frontiers in Optics / Laser Science, OSA Technical Digest, Optical Society of America, Sep. 2018, 2 pages.

Daniel J. Lum et al., Frequency-modulated continuous-wave LiDAR compressive depth-mapping, Optics Express, Jun. 4, 2018, pp. 15420-15435, vol. 26, No. 12.

\* cited by examiner

FEW-MODE AMPLIFIED RECEIVER FOR LIDAR

CROSS-REFERENCE TO RELATED APPLICATION

The present application claims the benefit under 35 U.S.C. § 119(e) of U.S. Provisional Application Ser. No. 62/721,149, filed Aug. 22, 2018, entitled RECEIVER WITH MULTI-MODE PRE-AMPLIFIER FOR LIDAR, naming Rachel Sampson, Guifang Li, He Wen, Yuanhang Zhang, Huiyuan Liu, Peng Zhang, and Robert Stegeman as inventors, which is incorporated herein by reference in the entirety.

GOVERNMENT LICENSE RIGHTS

This invention was made with Government support under contract 1649522 awarded by the National Science Foundation (NSF) through the NSF Graduate Research Fellowship Program. The Government has certain rights in this invention.

TECHNICAL FIELD

The present disclosure relates generally to LIDAR systems and, more particularly, to few-mode LIDAR receivers.

BACKGROUND

Optical ranging systems such as Light Detection and Ranging (LIDAR) systems are useful for characterizing various aspects of remote objects such as, but not limited to, the relative location and/or velocity of a remote object with respect to a ranging system. LIDAR systems typically operate by illuminating a remote object and analyzing light reflected or scattered from the remote object to generate a measurement. Further, LIDAR measurements may be performed using pulsed or coherent continuous-wave (CW) illumination.

It is typically desirable to achieve a high signal to noise ratio SNR to provide a desired level of performance. In a general sense, the SNR of a LIDAR system may be increased by either increasing the illumination power and/or increasing the detection sensitivity. However, implementing LIDAR systems in a particular application may introduce various constraints such as, but not limited to, cost, system footprint (e.g., size or weight), operational wavelength (e.g., whether illumination is eye-safe), power requirements, or detection speed that may practically limit the ability to achieve the desired level of performance. For example, applications requiring portable LIDAR systems such as, but not limited to, automotive vehicles applications (e.g., autonomous vehicles), may impose limits on the power and/or intensity of an illumination source. For instance, it may be generally desirable to limit illumination power and/or intensity to limit the electrical power requirements of the system as a whole. Further, additional safety or regulatory constraints may exist depending on whether the operational wavelength of the illumination source is eye safe. Accordingly, it may be desirable to achieve a desired signal to noise ratio by providing highly sensitive optical detection.

It is further typically desirable to provide high-speed (e.g., high bandwidth) detection. For example, high-speed detection of the return signal may facilitate rapid scanning of an illumination beam to perform LIDAR measurements across a wide field of view or with a high frame rate. Accordingly, the scanning speed may be limited by the detection bandwidth of the detector. By way of another example, in some cases, illumination from a LIDAR system may be modulated (e.g., in frequency, phase, and/or amplitude) to distinguish the return signal from other optical signals that may be present or to correlate received signals with a particular position in the field of view of a scanning system. In such cases, a LIDAR measurement system must possess requisite detection bandwidth to identify and/or parse the modulated signal.

One challenge associated with sensitive detection of LIDAR signals relates to the nature of the light reflected or scattered from a remote object of interest. In particular, many real-world objects of interest in LIDAR application have optically-rough surfaces such that reflected or scattered light received by a LIDAR system typically includes a speckle pattern of bright and dark spots, which may be characterized as having multiple spatial modes. However, multi-mode receivers typically suffer from limited sensitivity and/or limited detection speed. There is therefore a need to provide systems and methods curing the above deficiencies.

SUMMARY

A few-mode light detection and ranging (LIDAR) system is disclosed in accordance with one or more illustrative embodiments of the present disclosure. In one illustrative embodiment, the system includes an illumination source to generate an illumination beam. In another illustrative embodiment, the system includes one or more transmission optics to direct at least a portion of the illumination beam within a field of view. In another illustrative embodiment, the system includes one or more collection optics to collect return light from an object in the field of view illuminated by the illumination beam, where the collected return light includes a plurality of spatial modes. In another illustrative embodiment, the system includes a few-mode optical amplifier configured to optically amplify portions of the return light propagating along at least two of the plurality of spatial modes. In another illustrative embodiment, the system includes a detector to convert output light from the few-mode optical amplifier to an output electrical signal.

A few-mode light detection and ranging (LIDAR) system is described in accordance with one or more illustrative embodiments of the present disclosure. In one illustrative embodiment, the system includes an illumination source to generate an illumination beam. In accordance with one or more illustrative embodiments of the present disclosure, the system includes one or more transmission optics to direct at least a portion of the illumination beam within a field of view. In accordance with one or more illustrative embodiments of the present disclosure, the system includes one or more collection optics to collect return light from an object in the field of view illuminated by the illumination beam, where the collected return light includes a plurality of spatial modes. In accordance with one or more illustrative embodiments of the present disclosure, the system includes a few-mode waveguide to receive at least two spatial modes of the return light, where at least a portion of the few-mode waveguide is formed from an optical gain medium. In accordance with one or more illustrative embodiments of the present disclosure, the system includes a pump configured to generate a population inversion in the optical gain medium, where the return light propagating along the at least two of the plurality of spatial modes is amplified when propagating through the optical gain medium. In accordance with one or more illustrative embodiments of the present disclosure, the system includes a detector to convert output light from the few-mode waveguide to an output electrical signal.

A few-mode light detection and ranging (LIDAR) system is disclosed in accordance with one or more illustrative embodiments of the present disclosure. In one illustrative embodiment, the system includes an illumination source to generate an illumination beam. In accordance with one or more illustrative embodiments of the present disclosure, the system includes one or more transmission optics to direct at least a portion of the illumination beam within a field of view. In accordance with one or more illustrative embodiments of the present disclosure, the system includes one or more collection optics to collect return light from an object in the field of view illuminated by the illumination beam, where the collected return light includes a plurality of spatial modes. In accordance with one or more illustrative embodiments of the present disclosure, the system includes a few-mode local oscillator to generate light in two or more spatial modes, where the light in each of the two or more spatial modes has a different optical frequency and where the few-mode local oscillator is phase coherent with the illumination source. In accordance with one or more illustrative embodiments of the present disclosure, the system includes a beam combiner to align the return light along a common optical path with the light from the few-mode local oscillator. In accordance with one or more illustrative embodiments of the present disclosure, the system includes a detector to convert output light from the common optical path to an output electrical signal, where the return light is coherently mixed with the light from the two or more spatial-mode optical modulators on the detector.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1:
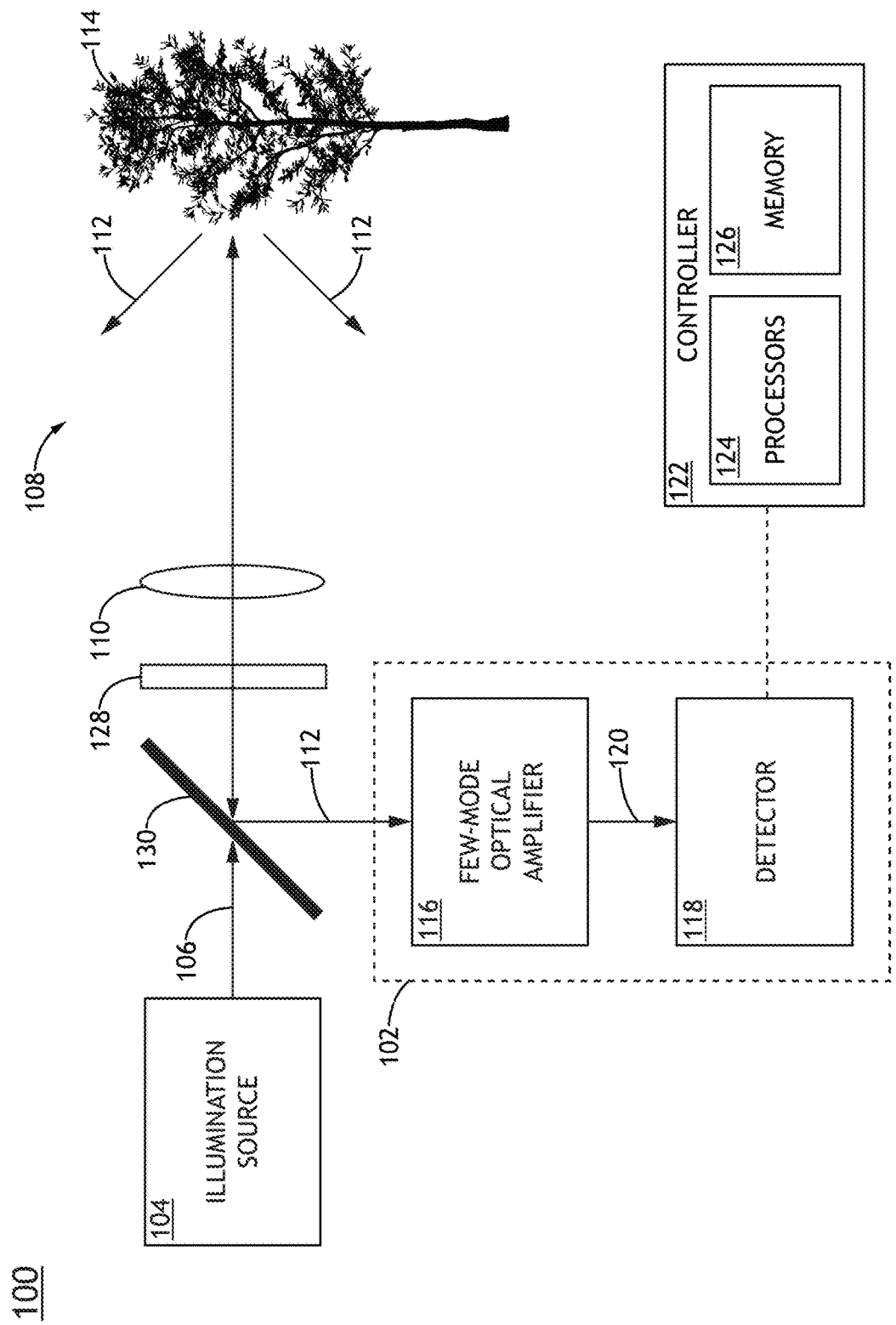
FIG. 1 is a conceptual view of a few-mode LIDAR system in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for amplified few-mode LIDAR detection. LIDAR may be implemented by illuminating one or more remote objects, collecting return light from the remote objects, and generating one or more ranging measurements associated with the remote objects. The ranging measurements may include, but is not limited to, a distance between a component of a LIDAR system and a remote object, or a velocity of a remote object including a speed and/or direction of the object. In many cases, a remote object is optically rough such that the return light is diffuse with a spatial profile characterized by a speckle pattern. In particular, the speckle pattern may include alternating regions of relatively high and low intensity, where the particular pattern may be influenced by the operating wavelength, distance to the remote object, surface profile of the illuminated portion of the remote object, variations along the optical path between the LIDAR system and the object (e.g., turbulence, and the like), and the coherence of the illumination beam.

It is recognized herein that the speckle pattern associated with return light in a LIDAR system includes multiple spatial modes. Accordingly, embodiments of the present disclosure are directed to systems and methods for capturing the multi-mode return light to provide efficient collection of relevant signals from remote objects of interest. Embodiments of the present disclosure are further directed to systems and methods for amplifying at least some of the captured spatial modes of the return light to provide a high SNR for detected light used to generate the ranging measurements. Such amplified few-mode detection may utilize a greater portion of the return light for ranging measurements than LIDAR systems with single-mode receivers, which may facilitate improved performance by enabling increased SNR at a particular illumination power or reduced illumination power required to achieve a desired performance.

It is further recognized herein that detection speed (e.g., detection bandwidth) is a critical factor for many LIDAR applications. For example, it may be desirable to scan an illumination beam across a wide field of view to rapidly perform ranging measurements on multiple objects within the field of view. The detection speed of a LIDAR sensor may thus limit the size of the field of view, the spatial resolution within a selected field of view, and/or the refresh rate within a selected field of view. By way of another example, it may be useful to encode or otherwise modulate an illumination beam in a LIDAR system to perform various functions such as, but not limited to, facilitate a certain type of ranging measurement, correlating return signals to particular directions in a field of view in a scanning system (e.g., using optical code division multiple-access system (OCDMA) techniques, or to distinguish the associated return signal from other sources of light or noise present.

Embodiments of the present disclosure are additionally directed to systems and methods for optically amplifying multiple spatial modes in a return signal, followed by detection using a high-bandwidth detector such as, but not limited to, a PN photodiode, a PIN photodiode, or a metal-semiconductor-metal photodetector. For example, a LIDAR system including a few-mode optical amplifier may include a few-mode optical amplifier to directly amplify portions of return light from remote objects corresponding to at least two spatial modes.

For the purposes of the present disclosure, the term "optical amplification" is intended to apply to techniques for optically increasing a detected signal associated with return light from remote objects by modifying or otherwise controlling light incident on a detector. For example, optical amplification in the context of the present disclosure may refer to optical gain achieved by stimulated emission of a pumped gain medium to increase the intensity of return light. By way of another example, optical amplification in the context of the present disclosure may refer to coherent amplification techniques such as optical heterodyne detection. In this case, return light is mixed with light from a local oscillator (LO) and detected by a square-law detector (including most photodetectors), where the resulting photocurrent is related to a square of the intensities of received light. As a result, an output electrical signal from the detector includes a term associated with a difference frequency (e.g., a beat frequency, an intermediate frequency, or the like) with a strength proportional to the product of the intensities of the return light and the LO. When the intensity of the LO is stronger than that of the return light, this difference signal exhibits gain. Further, optical amplification in the context of the present disclosure may be distinguished from alternative amplification techniques including electronic amplification in which a detection signal is electronically amplified after a photodetector such as a transimpedance amplifier, or within a photodetector with internal amplification such as an avalanche photodiode (APD). In particular, any gain in an optical amplifier is related to the specific arrangement and intensities of light directed to the detector rather than any particular operational characteristics of the detector (e.g., the large reverse bias associated with an APD). However, it is to be understood that the use of optical amplification does not preclude additional amplification stages including, but not limited to, electronic amplification.

Additional embodiments of the present disclosure are directed to few-mode optical amplifiers for LIDAR receivers. For the purposes of the present disclosure, the term "few mode" is intended to refer to systems and methods supporting less than approximately 100 transverse modes. For example, in the context of the present disclosure, the term few-mode may refer to sub-ranges such as, but not limited to, less than approximately 50 modes or less than approximately 10 modes. A few-mode optical amplifier may thus be distinguished from a conventional multi-mode optical amplifier known in the art that may support many modes (e.g., hundreds of modes), which may be unsuitable for some LIDAR applications. Few-mode fibers are generally described in U.S. Pat. No. 9,563,011 titled "Optical Transmission using Few-Mode Fibers" issued on Feb. 7, 2017, which is incorporated herein by reference in its entirety. In particular, a few-mode optical amplifier may include a few-mode waveguide (e.g., a few-mode fiber, a few-mode solid-state waveguide, or the like) that may support fewer spatial modes than a conventional multi-mode waveguide, sometimes far fewer. For example, the number of spatial modes supported by an optical fiber may be characterized as:

$$N = 2n(n+1), \quad (1)$$

$$n = \frac{V}{\pi}, \quad (2)$$

and $$V = \frac{2\pi NA}{\lambda}, \quad (3)$$

where V is a normalized frequency parameter, NA is the numerical aperture of the fiber, and $\lambda$ is the wavelength of light. For a few-mode fiber, the V-number may be lower (sometimes substantially lower) than for a conventional multi-mode fiber. This may be accomplished, for example, by modifying the core diameter, and the refractive indices of the core and cladding materials to provide a desired V-number. In some cases, the V-number of a few-mode fiber may have values, such as, but not limited to, approximately 20 or less, 10, or less, 5 or less, or the like.

It may be desirable to limit or otherwise control the number of spatial modes supported by an amplifier in a LIDAR system. For example, in optical amplifiers utilizing stimulated emission to provide gain, the presence of amplified spontaneous emission (ASE) may represent a significant source of noise that may limit the SNR of the system. Further, ASE may scale with the number of spatial modes supported by the amplifier. As a result, the ASE generated in an optical amplifier supporting a high number of optical modes may counteract the benefits of capturing multiple spatial modes of return light, particularly when the number of spatial modes supported by the amplifier exceeds the number of spatial modes present in the return light. By way of another example, multi-mode waveguides used in conventional multi-mode amplifiers supporting many modes may suffer from modal dispersion and/or mode coupling. Accordingly, conventional multi-mode amplifiers may be unsuitable for some LIDAR applications.

In some embodiments of the present disclosure, a number of modes supported by a few-mode optical amplifier in a LIDAR receiver is selected based on an expected number of spatial modes associated with return light, which may depend on factors such as, but not limited to, the radius of an illumination beam on a remote target or a distance to the remote target. Further, in some embodiments of the present disclosure, the number of spatial modes supported by a few-mode optical amplifier in a LIDAR receiver is configurable. In this regard, the few-mode optical amplifier may be adjusted based on changing measurement conditions.

Various embodiments of the present disclosure include different configurations of components forming a few-mode optical amplifier suitable for different LIDAR schemes including, but not limited to, pulsed LIDAR, amplitude-modulated continuous-wave (AMCW) LIDAR, or frequency-modulated continuous-wave (FMCW) LIDAR without departing from the spirit and scope of the present disclosure.

In some embodiments, a few-mode optical amplifier suitable for use in a LIDAR system includes a few-mode optical pre-amplifier prior to an optical detector. For example, a few-mode optical pre-amplifier may include a few-mode waveguide configured to support the propagation of at least two spatial modes of light in the operational spectrum, where at least a portion of the few-mode waveguide is formed from an optical gain medium. The few-mode waveguide may have any form-factor including, but not limited to, a few-mode fiber, or a few-mode solid-state (e.g., on-chip) waveguide. In this regard, return light from remote objects propagating through the few-mode waveguide along two or more spatial modes may be optically amplified when the gain medium is pumped. Further, the gain medium may be pumped using any technique known in the art including, but not limited to, optical or electrical pumping.

It is recognized herein that a few-mode optical amplifier including a few-mode waveguide formed from a gain medium may be suitable for, but is not limited to, time-of-flight (TOF) LIDAR systems such as, but not limited to, pulsed LIDAR, or AMCW LIDAR. TOF LIDAR systems typically provide ranging measurements by illuminating remote targets with an amplitude-modulated illumination beam (e.g., a train of pulses, a CW illumination beam having a selected amplitude modulation pattern, or the like), where a ranging measurement is based at least in part on a measured time delay associated with a round-trip time of light to and from the remote objects. For example, ranging measurements of a remote object may be performed by illuminating the remote object with amplitude-modulated light and monitoring the return pulse reflected or scattered from the remote object. The distance (d) to the remote object may then be related to a measured round-trip time ($\tau_d$) of the pulse to and from the remote object by the equation:

$$d = \frac{c\tau_d}{2} \tag{4}$$

where the 2 in the denominator arises from the fact that the pulse travels twice the distance (d) to the remote object. Additionally, the velocity may be measured based on changes in this distance over time based on successive measurements.

Accordingly, a few-mode optical amplifier including a few-mode waveguide formed from a gain medium may provide a high optical gain across a wide frequency range, which may facilitate high-speed (high-bandwidth) ranging measurements when coupled with a high-bandwidth detector. For instance, such a LIDAR system may enable the use of ultrashort illumination pulses or modulation schemes to provide rapid measurements and/or efficient scanning of a field of view.

In some embodiments, a few-mode optical amplifier suitable for use in a LIDAR system includes a coherent amplifier based on optical heterodyne detection of return light from remote objects. In particular, a few-mode optical amplifier may include a few-mode LO, where each spatial mode in the LO has a different optical frequency. Accordingly, each spatial mode may be differentiated in an output electrical signal from the detector.

It is recognized herein that few-mode heterodyne detection may present challenges for LIDAR applications. In particular, the speckle pattern associated with return light typically includes random variations in phase across the profile as well as variations in amplitude. Accordingly, coupling the speckle pattern into a few-mode waveguide may result in multiple spatial modes in waveguide, where each spatial mode may have a different phase. However, coherently mixing the multiple spatial modes with a common LO may result in an output electrical signal associated with a common difference frequency for all of the spatial modes. However, a result of the varying phases of the different spatial modes, contributions to the output electrical signal from the detector at the common difference frequency associated with the different spatial modes may at least partially cancel each other out. In this regard, any increase in performance obtained by capturing multiple spatial modes of the return light may be offset. For this reason, many CW LIDAR systems are limited to single-mode operation, which may discard a substantial portion of the available return light and limit the system performance.

In some embodiments, a few-mode optical amplifier includes a few-mode LO, where each spatial mode in the few-mode LO is modulated with a unique frequency. For example, a LIDAR system may illuminate remote targets with a narrow-band illumination beam and coherently amplified at least some of the few-mode return light with the few-mode LO. In this regard, the contributions of the different spatial modes to the output electrical signal from the detector may correspond to different frequencies. Accordingly, the strength of the output electrical signal may correspond to a constructive summation of the contributions from the various spatial modes.

Additional embodiments of the present disclosure are directed to a few-mode optical amplifier for a FMCW LIDAR system. In a general sense, FMCW LIDAR may illuminate remote objects with a coherent CW illumination beam, where the optical frequency of the illumination beam is modulated with a selected pattern (e.g., a linear ramp in a saw-tooth pattern, or the like). Further, the coherent illumination beam may be split such that a first portion may be directed outwards to illuminate an area of interest and a second portion may be retained as a local oscillator (LO) and mixed with return light. Various ranging measurements such as, but not limited to, the distance to a remote object or the velocity of a remote object may then be generated based on this difference frequency and the selected frequency modulation pattern.

For example, the modulation pattern may include a linear ramp of the optical frequency, but is not limited to, a saw-tooth pattern or a triangle wave pattern. In this case, mixing the return light from a static remote object with a LO may generate a difference frequency $f_d$ in the output electrical signal generated by the detector that is related to the time delay $\tau_d$ (and thus the range) by $f_d = \gamma \tau_d$, where $\gamma$ is the slope of the linear ramp in units of Hertz per second.

In some embodiments of the present disclosure, a few-mode optical amplifier includes a few-mode LO in which the portion of frequency-modulated illumination beam retained as the LO is split into multiple LO channels. Further, the few-mode LO may include frequency-shifters on at least some of the LO channels such that each LO channel is shifted by a unique frequency (e.g., mode-specific shift frequency). Thus, the contributions of the different spatial modes to the output electrical signal from the detector may correspond to different frequencies. Accordingly, the strength of the output electrical signal may correspond to a constructive summation of the contributions from the various spatial modes.

Additional embodiments are directed to the generation of ranging measurements based on the multiple difference frequencies. In some embodiments, a coherent LIDAR system with a few-mode receiver includes a controller to determine a time delay ($\tau_d$) associated with an object range based on the output signal. For example, a signal analyzer may generate a reference signal having a nominal power for all of the mode-specific shift frequencies associated with the multiple LO beams and no power otherwise, and may further perform a cross-correlation operation between the output signal and the reference signal. Accordingly, a delay corresponding to a peak of the cross-correlation signal may correspond to the time delay associated with the object range.

LIDAR systems including a few-mode optical amplifier described herein may provide higher performance than systems including alternative amplification techniques such as APDs or single-photon APDs (SPADs) with internal amplification that are commonly used in LIDAR systems. For example, a few-mode optical amplifier as described herein may be less susceptible to saturation or "blinding" than a SPAD in response to bright ambient light that may be commonly encountered in practical applications such as autonomous vehicle ranging.

By way of another example, optical amplification followed by detection may provide a higher bandwidth than an APD. In particular, APDs exhibit a gain-bandwidth product that limits the available gain as bandwidth increases, which may be particularly detrimental for high-bandwidth applications in which a signal is weak. For instance, consider a LIDAR system suitable for automotive applications having a field of view of 120° in a horizontal direction and 40° in a horizontal direction, an angular resolution of 0.05° in both horizontal and vertical directions, and a frame rate of 20 Hz. Such a system would require a theoretical sampling rate of 38.4 MHz to meet the desired resolution. However, in a scanning LIDAR system where remote objects may exist at different distances in different portions field of view, the scanned illumination may be encoded (e.g., using an OCDMA technique) to correlate received light signals to position in the field of view. Accordingly, this system may require a code length of at least 129, which may increase the practical sampling rate to 5 GHz. Such a bandwidth requirement may be beyond the capabilities of high-gain APDs. However, optical amplification followed by detection with a high-bandwidth detector as described herein may provide a sufficient gain at a desired bandwidth for high-resolution sampling. It is to be understood, however, that the above example was provided solely for illustrative purposes and should not be interpreted as limiting.

It is further recognized herein that LIDAR systems including a few-mode optical amplifier as described herein may provide advantages over current technologies. Many current LIDAR systems, particularly those for automotive applications, operate with wavelengths at or around 905 nm and 1550 nm due to the available technologies, solar radiation concentration, and atmospheric absorption at those wavelengths. However, current technologies at these wavelengths suffer from various limitations. For example, systems operating at 905 nm may utilize silicon-based multi-mode APDs and SPADs, which may provide multi-mode detection at a reasonable cost. However, as described previously herein, SPADs may suffer from saturation issues and APDs from limited gain-bandwidth product that may limit use in high-bandwidth applications. Further, 905 nm is not considered eye-safe, which limits the maximum illumination power that may be used and consequently the available range. By way of another example, systems operating at 1550 nm may utilize increased illumination power since 1550 nm is considered eye-safe. However, current multi-mode receivers (e.g., APDs) designed for 1550 nm light have much lower sensitivity than their silicon counterparts and still suffer from saturation and limited gain-bandwidth limitations. In contrast, a LIDAR system incorporating a few-mode optical amplifier as described herein may leverage optical amplification of multiple spatial modes to efficiently utilize return light high-bandwidth detectors at any selected operational spectrum.

Referring now to FIGS. 1 through 11, systems and methods for few-mode LIDAR are described in greater detail in accordance with one or more embodiments of the present disclosure.

FIG. 1 is a conceptual view of a LIDAR system 100 with a few-mode receiver 102, in accordance with one or more embodiments of the present disclosure. In one embodiment, the LIDAR system 100 includes an illumination source 104 to generate an illumination beam 106 for illuminating at least a portion of a field of view 108 (e.g., an area of interest), one or more collection optics 110 to collect return light 112 from one or more remote objects 114 in the field of view 108, and a few-mode receiver 102 to detect two or more spatial modes of the return light 112.

In one embodiment, the few-mode receiver 102 includes a few-mode optical amplifier 116 to optically amplify two or more spatial modes of the return light 112, and a detector 118 to generate output electrical signals based on output light 120 from the few-mode optical amplifier 116.

The LIDAR system 100 may further include a controller 122 communicatively coupled to any of the components of the LIDAR system 100. In this regard, the controller 122 may execute any of the various process steps described throughout the present disclosure. For example, the controller 122 may receive the output electrical signals from the detector 118 and perform one or more analysis steps to generate LIDAR data (e.g., ranging data) including, but not limited to, distances, velocities, compositions, or classifications (e.g., person, animal, building, automobile, vegetation, or the like) of remote objects 114. By way of another example, the controller 122 may generate control signals to direct or otherwise control any components of the LIDAR system 100.

In one embodiment, the controller 122 includes one or more processors 124 configured to execute program instructions maintained on a memory medium 126. In this regard, the one or more processors 124 of controller 122 may execute any of the various process steps described throughout the present disclosure.

The one or more processors 124 of a controller 122 may include any processing element known in the art. In this sense, the one or more processors 124 may include any device configured to execute algorithms and/or instructions. In one embodiment, the controller 122 may include a desktop computer, mainframe computer system, workstation, image computer, parallel processor, or any other computer system (e.g., networked computer) configured to execute a program configured to operate the LIDAR system 100, as described throughout the present disclosure. It is further recognized that the term "processor" may be broadly defined to encompass any device having one or more processing elements, which execute program instructions from a non-transitory memory medium 126. For example, the processors 124 may include, are not limited to, one or more microprocessors, one or more single-core processors, one or more multi-core processors, one or more field-programmable gate arrays (FPGAs), one or more application-specific integrated circuits (ASICs), or one or more logic gates.

The memory medium 126 may include any storage medium known in the art suitable for storing program instructions executable by the associated one or more processors 124. For example, the memory medium 126 may include a non-transitory memory medium. By way of another example, the memory medium 126 may include, but is not limited to, a read-only memory, a random access memory, a magnetic or optical memory device (e.g., disk), a magnetic tape, a solid state drive and the like. It is further noted that memory medium 126 may be housed in a common controller housing with the one or more processors 124. In one embodiment, the memory medium 126 may be located remotely with respect to the physical location of the one or more processors 124 and controller 122. For instance, the one or more processors 124 of controller 122 may access a remote memory (e.g., server), accessible through a network (e.g., internet, intranet and the like). Therefore, the above description should not be interpreted as a limitation on the present invention but merely an illustration.

The steps described throughout the present disclosure may be carried out by a single controller 122 or, alternatively, multiple controllers. Additionally, the controller 122 may include one or more controllers housed in a common housing or within multiple housings. In this way, any controller or combination of controllers may be separately packaged as a module suitable for integration into LIDAR system 100. Further, the controller 122 may analyze the output electrical signals received from the detector 118 and feed the data to additional components within the LIDAR system 100 or external to the LIDAR system 100.

The LIDAR system 100 may generate ranging measurements by illuminating one or more areas in the field of view 108 with the illumination beam 106 based on characteristics of return light 112 that is reflected, scattered, or otherwise received from any remote objects 114.

The LIDAR system 100 may generate ranging measurements for remote objects 114 within the field of view 108 using any technique known in the art. For example, the illumination beam 106 may be scanned within the field of view 108, taking multiple sequential measurements within the field-of-view, or the illumination beam may be employed in a flash manner, where the entire field-of-view is measured simultaneously In one embodiment, the LIDAR system 100 includes a beam-scanner 128 to scan the illumination beam 106 over at least a portion of the field of view 108. The beam-scanner 128 may include any combination of elements suitable for controlling or otherwise adjusting a direction of the illumination beam 106. For example, the beam-scanner 128 may include one or more translatable mirrors (e.g., having an adjustable tip and/or tilt), one or more spinning mirrors, one or more micro-electromechanical systems (MEMS), one or more prisms, and/or one or more optical phased arrays. In another embodiment, the LIDAR system 100 illuminates the field of view 108 with a large-area illumination beam 106 and captures return light 112 from an extended portion of the field of view 108 simultaneously (e.g., in a flash manner).

In another embodiment, the collection optics 110 may further operate as illumination optics to direct the illumination beam 106 to one or more locations within the field of view 108. For example, the LIDAR system 100 may include, but is not limited to, a beamsplitter 130 as illustrated in FIG. 1, or a mirror. In some embodiments, though not shown, the LIDAR system 100 may include one or more separate illumination optics. In this regard, the illumination beam 106 and the return light 112 may have different optical paths. However, ranging measurements may be performed based on a known relationship between the various components of the LIDAR system 100.

The illumination source 104 may include any type of light source capable of generating an illumination beam 106 suitable for LIDAR. Further, the illumination source 104 may generate an illumination beam 106 having any degree of temporal and/or spatial coherence suitable for a selected LIDAR technique. For example, the illumination source 104 may include, but is not limited to, a laser source, a light-emitting diode (LED) source, or a lamp source. In addition, the illumination source 104 may include one or more modulators (e.g., electro-optic modulators, acousto-optic modulators, or the like) to modulate or otherwise control the illumination beam 106.

In one embodiment, the illumination source 104 includes a pulsed light source to generate an illumination beam 106 formed from one or more light pulses. In this regard, the LIDAR system 100 may operate as a pulsed LIDAR system. Further, a pulsed illumination source 104 may generate pulses having any temporal width at any repetition rate. A pulsed illumination source 104 may generate light pulses using any technique known in the art including, but not limited to, mode-locking, Q-switching, optically pumping a gain medium with a pulsed pump source, electrically pumping a gain medium with a pulsed electronic source, or shuttering (e.g., with a mechanical shutter, an electro-optic modulator, an acousto-optic modulator, or the like).

In another embodiment, the illumination source 104 includes a CW light source to generate a CW illumination beam 106. In this regard, the LIDAR system 100 may operate as a FMCW LIDAR system, or a CW LIDAR system with a few-mode LO oscillator for coherent amplification of few-mode return light 112. For example, the LIDAR system 100 may include one or more components to modulate one or more aspects of the illumination beam 106 such as, but not limited to, an amplitude (e.g., for AMCW operation) or a frequency (e.g., for FMCW operation) of the illumination beam 106 an amplitude of the illumination beam 106. For example, the LIDAR system 100 may include an optical modulator (e.g., an electro-optic modulator, an acousto-optic modulator, or the like). By way of another example, the illumination source 104 may directly provide a modulated illumination beam 106.

In another embodiment, the illumination source 104 includes a tunable illumination source suitable for producing an illumination beam 106 with an adjustable wavelength or optical frequency. For example, the illumination source 104 may include a tunable laser with a selectable emission spectrum. By way of another example, the illumination source 104 may include a broadband light source with a broad emission spectrum and one or more tunable spectral filters.

The detector 118 may include any type of detector known in the art suitable for measuring light in the operational spectrum. For example, the detector 118 may include a PN photodiode, a PIN photodiode, an APD, or a metal-semiconductor-metal photodetector. Further, the detector 118 may be formed from any material or combination of materials suitable for operation in any selected operational spectrum including, but not limited to InGaAs, Ge, InAlAs, or silicon. The detector 118 may further operate at any selected bandwidth and/or have any selected response time. For example, the detector 118 may, but is not required to, operate with a bandwidth of 1 GHz, 5 GHz, 10 GHz, 50 GHz, or higher. However, it is to be understood that the detector 118 is not limited to any particular bandwidth or response time and may operate with a bandwidth lower than 1 GHz without departing from the spirit and scope of the present disclosure. By way of another example, the detector 118 may operate at a bandwidth equal to or higher than a bandwidth of the few-mode optical amplifier 116. In this regard, the detector 118 may not limit the operational bandwidth of the LIDAR system 100. Further, as described previously herein, it is recognized that a few-mode optical amplifier 116 may provide higher SNR at a selected bandwidth than amplified multi-mode detectors such as, but not limited to, APDs. Accordingly, the use of the few-mode optical amplifier 116 in the LIDAR system 100 may relax the responsivity requirements of the illumination source 104 and/or the detector 118 for a desired SNR.

Referring now to FIGS. 2 through 11, few-mode LIDAR is described in greater detail. As described previously herein, many remote objects 114 of interest that may be characterized using a LIDAR system are optically rough such that the intensity of the return light 112 is not spatially uniform. Rather, return light 112 reflected or scattered from a remote object is typically characterized by a speckle pattern having spatially-varying amplitude and/or phase, which may be based on spatial variations of the surface profile of a remote object 114, distance to the remote object 114, operational spectrum of the illumination source 104, and/or atmospheric conditions between the LIDAR system 100 and the remote object 114 (e.g., particulates, turbulence, or the like).

Figure 2:
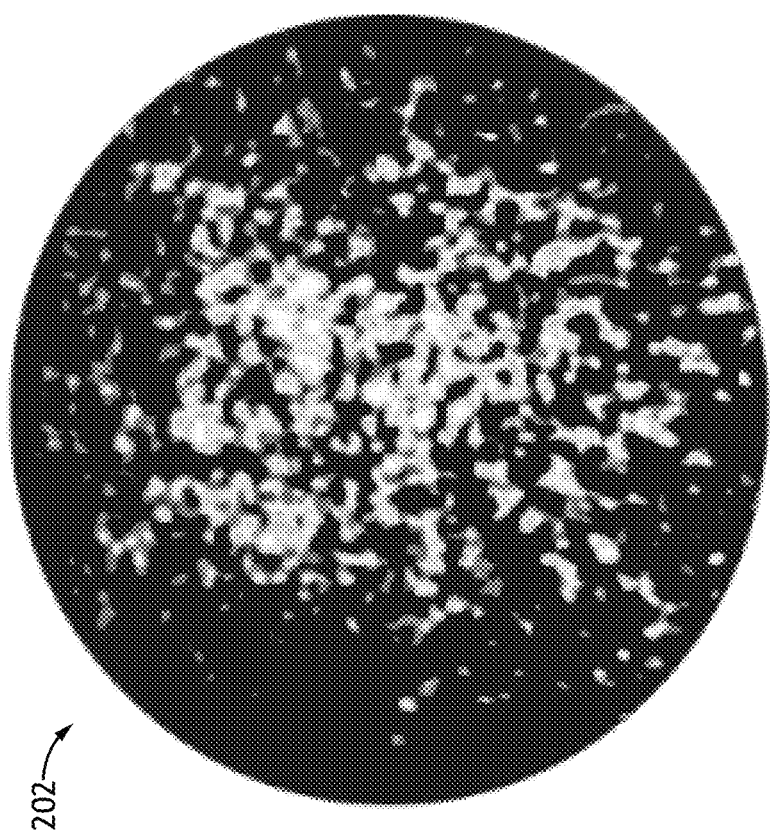
FIG. 2 is an image of return light from a remote object including a speckle pattern, in accordance with one or more embodiments of the present disclosure.

FIG. 2 is an image 202 of return light 112 from a remote object 114 including a speckle pattern, in accordance with one or more embodiments of the present disclosure. A speckle pattern associated with return light 112 may be characterized as having multiple spatial modes. Accordingly, a LIDAR system 100 may include a few-mode optical amplifier 116 capable of optically amplifying at least some of the spatial modes of the return light 112 and a detector 118 coupled to the few-mode optical amplifier 116 to generate an output electrical signal based at least in part on the amplified spatial modes. In this regard, the LIDAR system 100 may efficiently capture and utilize at least two of the spatial modes of the return light 112 for ranging measurements.

A few-mode optical amplifier 116 may include various configurations of components suitable for providing optical amplification of multiple modes of return light 112 using any selected amplification technique without departing from the spirit or scope of the present disclosure. In some embodiments, the few-mode optical amplifier 116 includes components suitable for providing optical amplification in a pumped few-mode gain medium, which may be utilized with a coherent or incoherent illumination beam 106. In some embodiments, the few-mode optical amplifier 116 include components suitable for providing coherent optical heterodyne detection (e.g., coherent amplification), which may be used with a coherent illumination beam 106.

Figure 3:
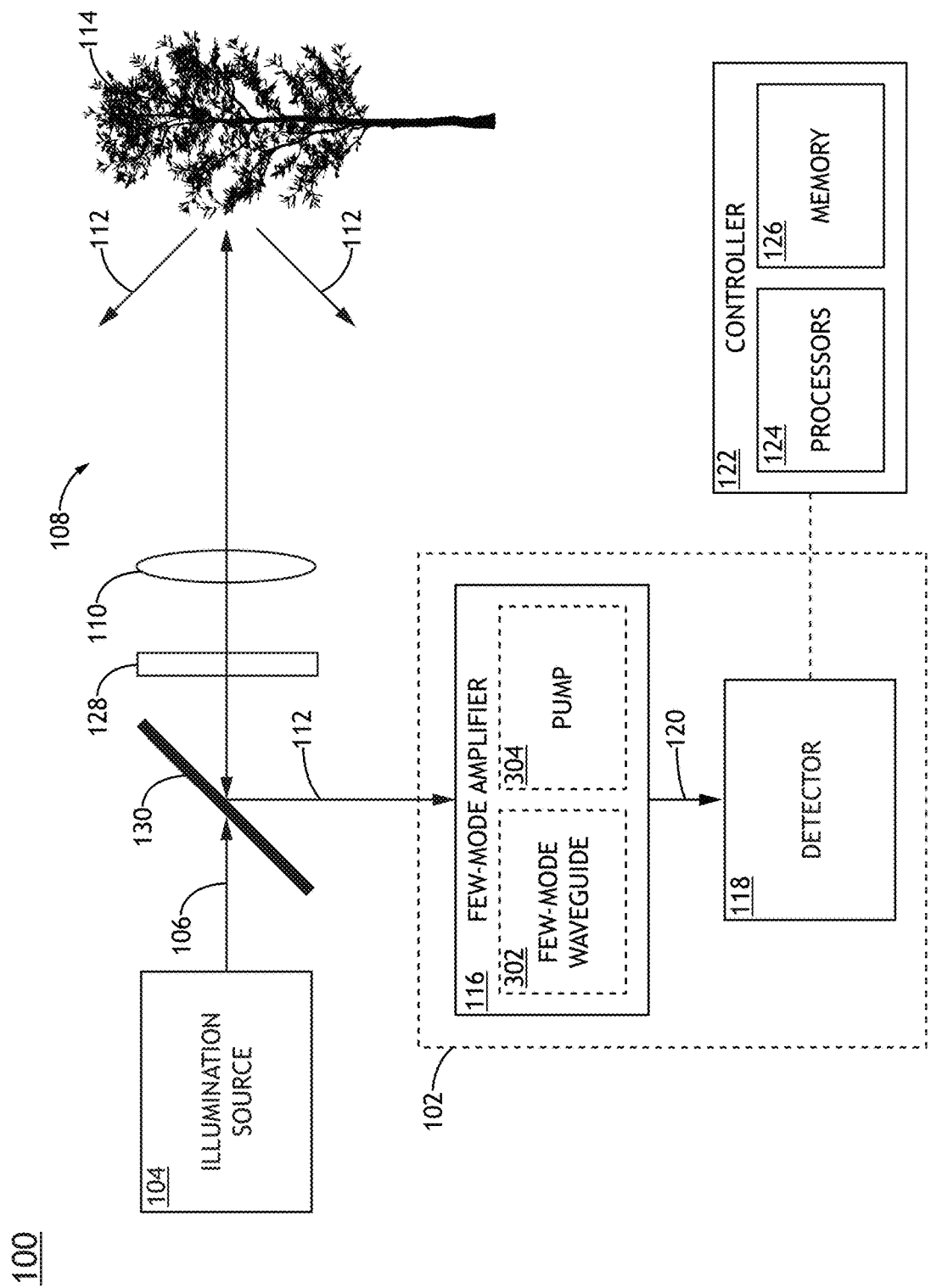
FIG. 3 is a conceptual view of a LIDAR system with a few-mode optical amplifier including a few-mode waveguide pumped to produce optical gain, in accordance with one or more embodiments of the present disclosure.

FIG. 3 is a conceptual view of a LIDAR system 100 with a few-mode optical amplifier 116 including a few-mode waveguide pumped to produce optical gain, in accordance with one or more embodiments of the present disclosure. In this regard, the few-mode optical amplifier 116 may operate as an optical pre-amplifier. Such a system may be suitable for, but is not limited to TOF LIDAR techniques utilizing a coherent or incoherent illumination beam 106.

In one embodiment, the few-mode optical amplifier 116 includes a few-mode waveguide 302 suitable for propagating multiple modes of light in the operational spectrum of the illumination source 104, where at least a portion of the few-mode waveguide 302 is formed from an optical gain medium. Further, the LIDAR system 100 may include a pump 304 to induce a population inversion in the optical gain medium. Accordingly, the multiple modes of the return light 112 may be amplified when propagating through the few-mode waveguide 302.

The optical gain medium may be pumped using any technique known in the art suitable for inducing a population inversion to provide optical gain for the return light 112. In one embodiment, the pump 304 includes a light source that generates pump illumination tuned to one or more absorption bands of the optical gain medium. In another embodiment, the pump 304 includes an electronic pump to inject an electrical current into the optical gain medium (e.g., through one or more electrodes) to excite electrons into a conduction band at a carrier density sufficient to support optical gain for light in the operational spectrum.

A few-mode optical amplifier 116 including a few-mode waveguide 302 may have any structure or form-factor known in the art including, but not limited to, a fiber-based amplifier, a semiconductor optical amplifier SOA, a solid-state amplifier, or a combination thereof.

Figure 4:
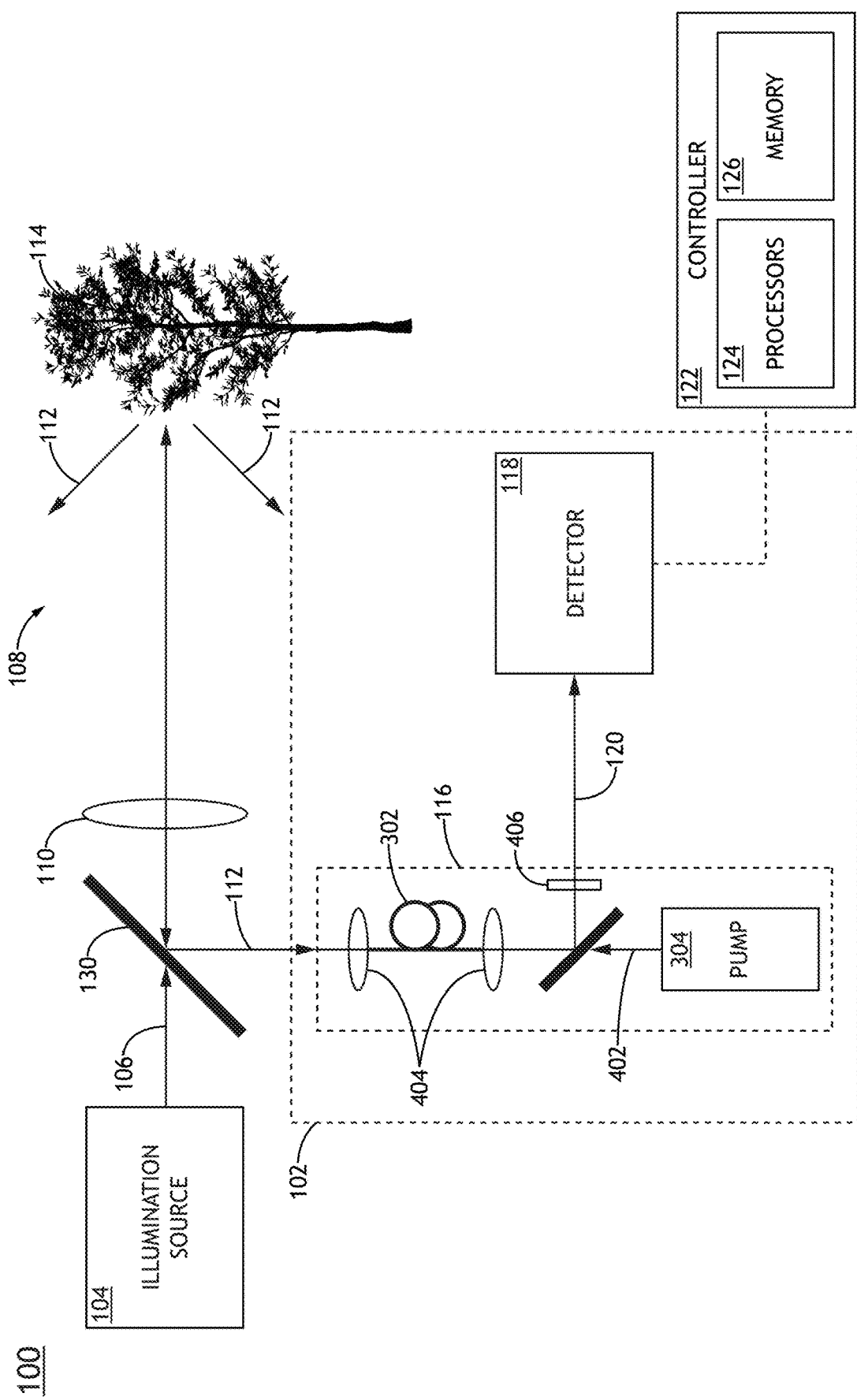
FIG. 4 is a conceptual view of LIDAR system including a fiber-based few-mode optical amplifier, in accordance with one or more embodiments of the present disclosure.

FIG. 4 is a conceptual view of LIDAR system 100 including a fiber-based few-mode optical amplifier 116, in accordance with one or more embodiments of the present disclosure. In one embodiment, the few-mode optical amplifier 116 is configured as a fiber amplifier, where the few-mode waveguide 302 includes one or more few-mode fibers, where at least one of the few-mode fibers is formed from a gain medium. For example, as illustrated in FIG. 4, a fiber-based few-mode optical amplifier 116 may include an optical pump 304 to generate pump light 402 tuned to an absorption band of the gain medium. Further, a fiber-based few-mode optical amplifier 116 may be pumped using any pumping geometry known in the art. In one instance, as illustrated in FIG. 4, the few-mode waveguide 302 including the gain medium may be reverse-pumped. Additionally, although not shown, the gain medium may be forward or bi-directionally pumped. In this regard, the few-mode optical amplifier 116 may include a wavelength-selective beam-splitter (e.g., a dichroic mirror, or the like) suitable for separating pump light 402 from the output light 120 of the few-mode waveguide 302 (e.g., including the amplified return light 112).

The few-mode optical amplifier 116 may further include one or more components 404 such as, but not limited to, lenses, to inject the return light 112 and/or the pump light 402 into the few-mode waveguide 302 as well as collect the output light 120 from the few-mode waveguide 302.

In another embodiment, the few-mode optical amplifier 116 includes beam-conditioning optics 406 to condition any combination of the return light 112, the pump light 402, or the output light 120. For example, the beam-conditioning optics 406 may include, but are not limited to, one or more couplers, one or more isolators, one or more additional lenses, one or more beam-shapers, one or more filters, one or more polarizers, one or more waveplates, or one or more phase plates. In one instance, the beam-conditioning optics 406 include one or more spectral filters to filter out amplified spontaneous emission (ASE) from the output light 120.

Any suitable gain medium known in the art may be utilized to provide gain at any selected operational spectrum. For example, the few-mode optical amplifier 116 may include an erbium-doped fiber amplifier (EDFA) including at least one erbium-doped few-mode fiber suitable for an operational spectrum including, but not limited to, 1550 nm, which may be, but is not required to be, optically pumped with a 946 nm or 1450 nm laser diode. An EDFA pre-amplifier suitable for a LIDAR system is generally described in R. Sampson, et al., "Improving the Sensitivity of LiDARs Using Few-Mode Pre-amplified Receivers" in Proceedings of Frontiers in Optics/Laser Science (Optical Society of America, 2018), FW7A.2, which is incorporated herein by reference in its entirety. It is recognized herein that the wide availability of components suitable for a 1550 nm operational spectrum may enable the production of a high-performance, rugged fiber-based LIDAR system with a relatively low cost. Further, the use of a 1550 nm light may be considered "eye-safe" such that the intensity of the illumination beam 106 may be relatively high and still conform to regulatory requirements for use in public applications including, but not limited to, autonomous vehicles. By way of another example, the few-mode optical amplifier 116 may include a neodymium-doped or ytterbium-doped fiber amplifier suitable for an operational spectrum including, but not limited to, 1 μm. By way of a further example, the few-mode optical amplifier 116 may include a thulium-doped fiber amplifier suitable for an operational spectrum including 1.47 μm (e.g., in the S-band) or in the 1.6-2.1 μm spectral range.

Referring now to FIGS. 5A through 6B, a comparison of the performance of a few-mode receiver 102 including an EDFA few-mode optical amplifier 116 to an APD is described in accordance with one or more embodiments of the present disclosure.

Figures 5A, 5B:
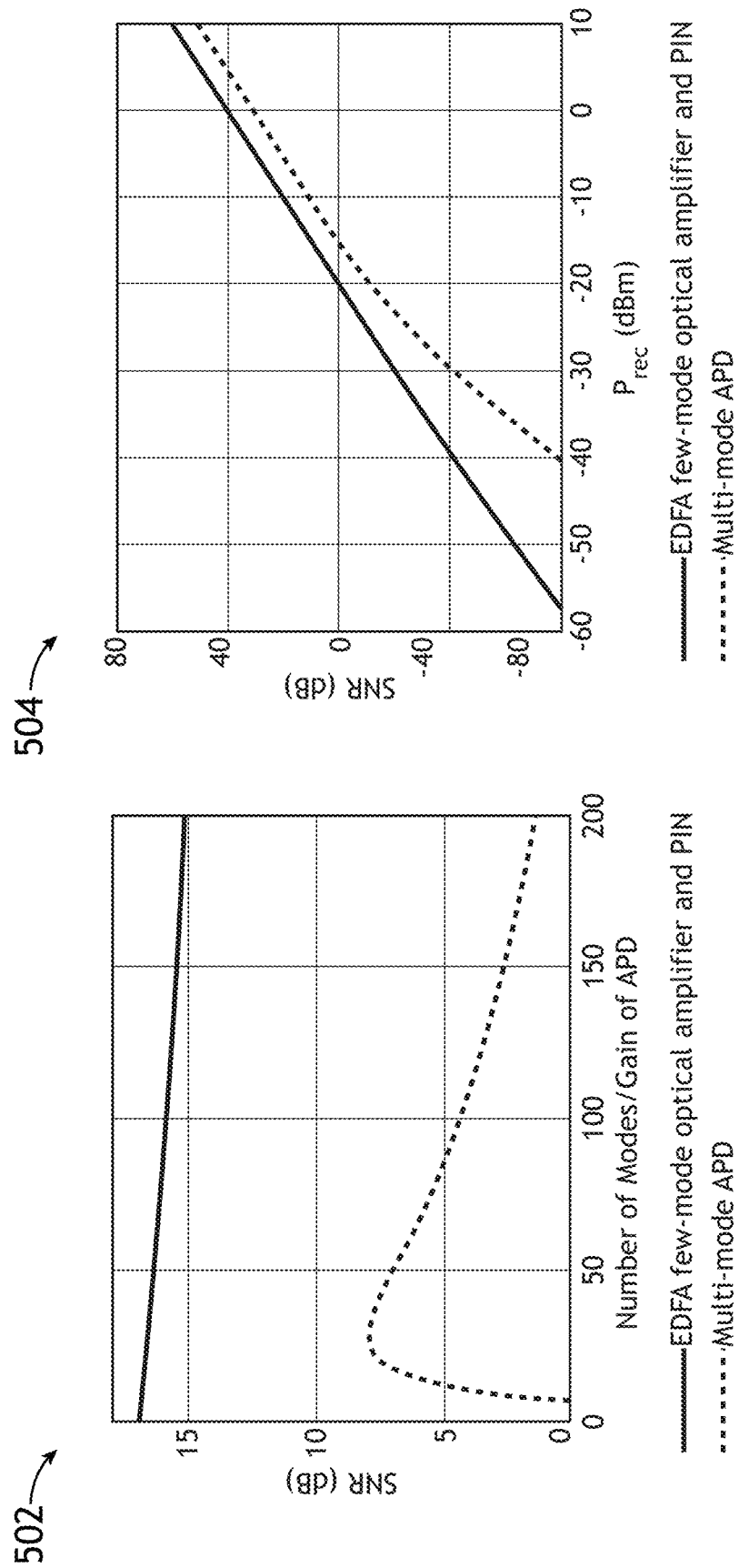
FIG. 5A is a plot of simulated performance of an few-mode receiver including an EDFA few-mode optical amplifier coupled to a PIN photodiode compared to a multi-mode APD, in accordance with one or more embodiments of the present disclosure.
FIG. 5B is a plot of simulated SNR for an EDFA few-mode optical amplifier coupled to a PIN detector and a multi-mode APD as a function of received power of return light with the number of spatial modes supported by the EDFA few-mode optical amplifier fixed at 5 and the APD gain fixed at 7, in accordance with one or more embodiments of the present disclosure.

FIG. 5A is a plot 502 of simulated performance of an few-mode receiver 102 including an EDFA few-mode optical amplifier 116 coupled to a PIN photodiode (e.g., detector 118) compared to a multi-mode APD, in accordance with one or more embodiments of the present disclosure. In particular, FIG. 5A shows a variation of the SNR for the few-mode receiver 102 including an EDFA few-mode optical amplifier 116 as a function of the number of spatial modes supported by the EDFA few-mode optical amplifier 116 ranging from 1 to 200, as well as a variation of the SNR for a multi-mode APD as a function of APD gain ranging from 1 to 200. The simulated few-mode receiver 102 including an EDFA few-mode optical amplifier 116 was configured as illustrated in FIG. 4 having a noise figure of 3 dB and an optical full-width at half-maximum bandwidth of 2 GHz for the spectral filter (beam-conditioning optic 406), and the simulated multi-mode APD was an InGaAs APD having an effective ionization coefficient ratio (k) of 0.7. The simulated return light 112 for both cases included 500 ps pulses, which corresponds to a depth resolution of 7.5 cm, of 1550 nm light with a received power of −50 dBm. Further, the simulated SNR values in FIG. 5A were calculated during a signal pulse.

The SNR of the EDFA few-mode optical amplifier 116 coupled to a PIN photodiode ranged from a high of 16.9 dB for one spatial mode to a low of 15.1 dB for 200 spatial modes. The SNR of the multi-mode APD peaked at approximately 8.0 dB at an APD gain of approximately 29. Accordingly, the SNR of the EDFA few-mode optical amplifier 116 coupled to a PIN photodiode was at least approximately 7.1 dB higher than the SNR of the multi-mode APD for all conditions in this simulation.

The number of spatial modes of return light 112 captured by the LIDAR system 100 may be related to the normalized space-bandwidth product of the LIDAR system 100. The capacity limit of spatially-multiplexed communication is described generally in N. Zhao, X. Li, and G. Li, "Capacity limits of spatially-multiplexed free-space communication," Nature Photonics 9, pp. 822-826 (2015), which is incorporated herein by reference in its entirety. In the context of LIDAR, the number of spatial modes (Q) supported by a finite-aperture LIDAR system 100 having a few-mode receiver 102 may be related to the normalized space-bandwidth product of the LIDAR system 100. In particular, the number of spatial modes (Q) supported by a finite aperture LIDAR system may be given by:

$$Q = 1.314 \cdot M(M+1) \quad (5)$$

and $$M = \frac{\left(\frac{\pi}{4}\right)(R \cdot D)}{\lambda \cdot L}, \quad (6)$$

where M is the normalized space-bandwidth product of the finite-aperture LIDAR system (e.g., the LIDAR system 100). Further, R, D, and L are the receiving aperture diameter, the lateral spatial resolution, and the maximum range of the LIDAR system, respectively. Typical values of R, D, and L for LIDAR systems used in automotive applications are between, but not limited to, 1 cm and 50 cm, between 1 cm and 50 cm, and 50 m to 300 m, respectively. For an example, at values of R, D, and L of 1 cm, 6 cm, and 200 m, respectively, the number of spatial modes (Q) is 5 per polarization.

FIG. 5B is a plot 504 of simulated SNR for the EDFA few-mode optical amplifier 116 coupled to a PIN detector 118 and the multi-mode APD as a function of received power ($P_{rec}$) of return light 112 with the number of spatial modes supported by the EDFA few-mode optical amplifier 116 fixed at 5 and the APD gain fixed at 7, in accordance with one or more embodiments of the present disclosure. The EDFA few-mode optical amplifier 116 consistently provides higher SNR values across the range of received powers in this simulation, indicating that a LIDAR system 100 with a few-mode receiver 102 may be well-suited for practical LIDAR applications including, but not limited to, automotive applications. In particular, the SNR improvement for the EDFA few-mode optical amplifier 116 coupled to a PIN detector 118 relative to the multi-mode APD is highest for low received powers in this simulation. In FIG. 5B, significant improvements are seen for received powers lower than approximately −25 dB.

Figure 6B:
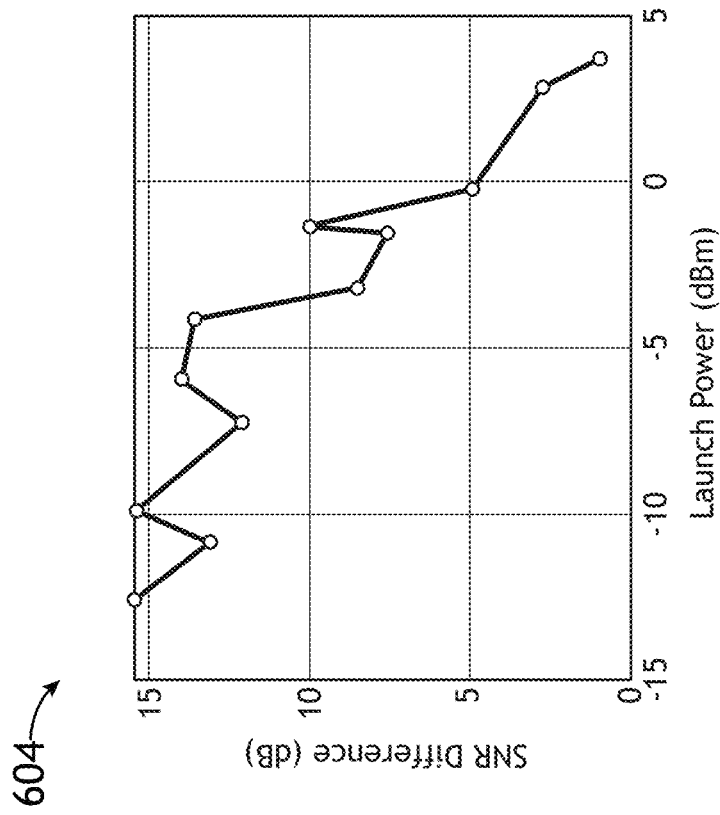
FIG. 6B is a plot of the difference between the SNR of the EDFA few-mode optical amplifier coupled to a PIN detector and the SNR of the multi-mode APD based on the data in FIG. 6A, in accordance with one or more embodiments of the present disclosure.
Figure 6A:
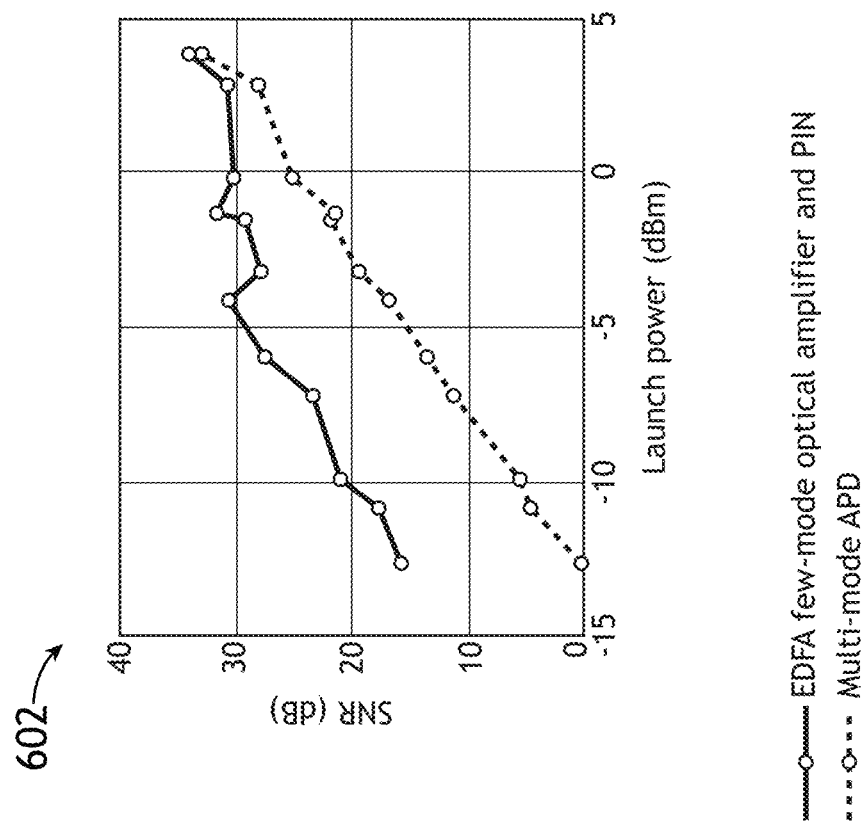
FIG. 6A includes a plot of the SNR of an EDFA few-mode optical amplifier coupled to a PIN photodiode and the multi-mode APD as a function of launch power, in accordance with one or more embodiments of the present disclosure.

FIGS. 6A and 6B include experimental results comparing the SNR of an EDFA few-mode optical amplifier 116 coupled to a PIN photodiode (e.g., detector 118) with a multi-mode APD as a function of launch power of the illumination beam 106, in accordance with one or more embodiments of the present disclosure. In particular, FIGS. 6A and 6B were generated based on a LIDAR system that was tested with two different receiver architectures. A first receiver included an EDFA few-mode optical amplifier 116 reverse-core-pumped by a 976 nm laser diode coupled to a PIN photodiode (e.g., detector 118) as described herein with respect to FIG. 4. The erbium-doped few-mode waveguide 302 had a doping concentration of $4 \times 10^{25}$ cm$^{-3}$, a length of approximately 2.5 m, and a core diameter of approximately 13 µm to support 10 spatial modes at an operational frequency of 1550 nm. A second receiver included a multi-mode InGaAs APD corresponding to the simulated APD in FIGS. 5A and 5B.

FIG. 6A includes a plot 602 of the SNR of the EDFA few-mode optical amplifier 116 coupled to a PIN photodiode and the multi-mode APD as a function of launch power, in accordance with one or more embodiments of the present disclosure. FIG. 6B is a plot 604 of the difference between the SNR of the EDFA few-mode optical amplifier 116 coupled to a PIN detector 118 and the SNR of the multi-mode APD based on the data in FIG. 6A, in accordance with one or more embodiments of the present disclosure. FIG. 6B may thus highlight the differences between the EDFA few-mode optical amplifier 116 and multi-mode APD detection techniques, where a positive value in FIG. 6B indicates the EDFA few-mode optical amplifier 116 coupled to a PIN photodiode outperforming the multi-mode APD.

As seen in FIGS. 6A and 6B, the EDFA few-mode optical amplifier 116 coupled to a PIN photodiode outperformed the multi-mode APD for all launch powers tested in both the open and partially-closed configurations. Further, the EDFA few-mode optical amplifier 116 coupled to a PIN photodiode significantly outperformed the multi-mode APD at low powers (here, lower than approximately 5 dBm), with a differential of greater than 15 dB in some cases.

Figure 7:
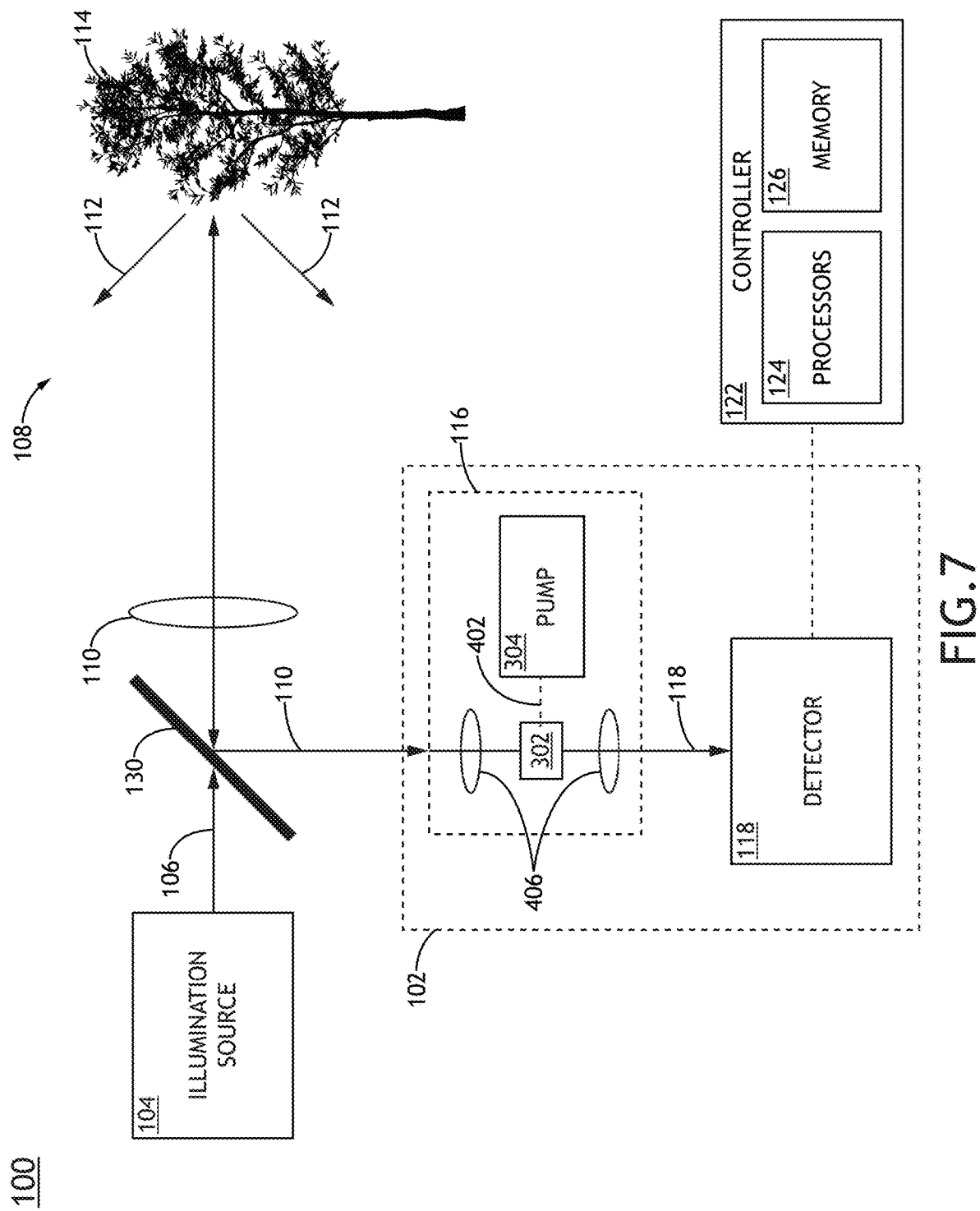
FIG. 7 is a conceptual view of a few-mode optical amplifier configured as a semiconductor optical amplifier (SOA), in accordance with one or more embodiments of the present disclosure.

Referring now FIG. 7, a conceptual view of a few-mode optical amplifier 116 configured as a semiconductor optical amplifier (SOA) is shown, in accordance with one or more embodiments of the present disclosure. In one embodiment, the few-mode waveguide 302 is a solid-state semiconductor device, where at least a portion of the few-mode waveguide 302 is formed from a gain medium. In this regard, a SOA few-mode optical amplifier 116 may be formed as an "on-chip" component and may be directly integrated with any number of additional components on one or more chips to form a fully or partially integrated LIDAR system. A SOA few-mode waveguide 302 may be fabricated from any material or combination of materials suitable for supporting multiple spatial modes in the operational spectrum including, but not limited to, InGaAs, GaAs, InP, silicon, or germanium. Further, the few-mode waveguide 302 may be fabricated with any form factor including, but not limited to, a ridge waveguide, a channel waveguide, a buried waveguide, a planar waveguide, or a graded-index waveguide.

A SOA few-mode optical amplifier 116 may include any type of pump 304 suitable for exciting the gain material. In one embodiment, as illustrated in FIG. 7, a SOA few-mode optical amplifier 116 includes an electrical pump 304 to provide an electrical current to one or more layers of the few-mode waveguide 302. In another embodiment, though not shown, the SOA few-mode optical amplifier 116 may be optically pumped in any configuration including, but not limited to, forward-pumped, a reverse-pumped configuration, or bi-directional pumped.

In one embodiment, the few-mode optical amplifier 116 provides uniform gain for multiple spatial modes of the return light 112. In another embodiment, the few-mode optical amplifier 116 provides a variable amount of gain for different spatial modes. It is recognized herein that gain of a particular spatial mode may depend on multiple factors including, but not limited to, the distribution of dopants throughout the gain medium associated with the few-mode waveguide 302, the mode overlap between pump light 402 and return light 112 in an optically pumped system, or the mode overlap between gain regions and return light 112 in an electrically-pumped system.

The gain in each spatial mode may be separately adjusted using any technique known in the art. For example, in a fiber-based few-mode optical amplifier 116, the gain in a particular spatial mode may be adjusted in various ways including, but not limited to, modifying the power of pump light 402 in the particular spatial mode or modifying the dopant distribution associated with the different spatial modes. In one instance, the power in a different spatial modes may be separately controlled by separately injecting pump light 402 into different spatial modes with components such as, but not limited to, phase masks, amplitude masks, waveplates, photonic lanterns, beam splitters, beam combiners, multi-plane light converters, spot-based mode converters, or longitudinal propagation constant matched couplers (e.g., matched propagation-constant mode converters). By way of another example, in a SOA few-mode optical amplifier 116 the gain in a particular spatial mode may be adjusted in various ways including, but not limited to, changing the pump distribution and modifying a quantum well distribution to overlap with the spatial modes of the return light 112 as well as the amount of gain associated with each quantum well. Few-mode SOAs providing uniform gain for multiple modes are described generally in H. Wen, et al., "Invited Article: Four mode semiconductor optical amplifier," APL Photonics 1, 070801 (2018), which is incorporated herein by reference in its entirety.

It is recognized herein that a few-mode optical amplifier 116 including a pumped few-mode waveguide 302 providing optical gain suitable for LIDAR applications may differ from conventional multi-mode amplifiers known in the art such as, but not limited to, multi-mode amplifiers used in communications applications. For example, characteristics of the few-mode optical amplifier 116 such as, but not limited to, the doping concentration, the distribution of dopants (or quantum wells as described above) controlling the distribution of gain for different modes, and the length of the few-mode waveguide 302 may be particularly determined for a particular LIDAR application. It is further recognized herein that the particular selected characteristics of the few-mode optical amplifier 116 may impact various performance metrics such as, but not limited to, the amount of ASE, the mode overlap between the pump light 402 and the return light 112, or mode crosstalk. Such differences may thus distinguish a few-mode amplifier suitable for LIDAR as described herein from a multi-mode amplifier suitable for other applications (e.g., high-bandwidth communications). In general, the minimum received power for LIDAR will be less than in communications. Therefore, a few-mode optical amplifier 116 suitable for LIDAR applications may be configured for lower received powers than for communications applications. For example, a few-mode optical amplifier 116 suitable for LIDAR applications may have relatively higher doping concentrations and/or waveguide lengths than required for communications applications.

Referring now to FIGS. 8A through 11, a few-mode optical amplifier 116 providing coherent amplification is described in greater detail in accordance with one or more embodiments of the present disclosure. The few-mode optical amplifier 116 may provide coherent amplification of return light 112 using any technique known in the art such as, but not limited to, few-mode optical heterodyne detection in which each spatial mode is optically mixed with a local oscillator with a different mode-specific reference frequency.

Figure 8A:
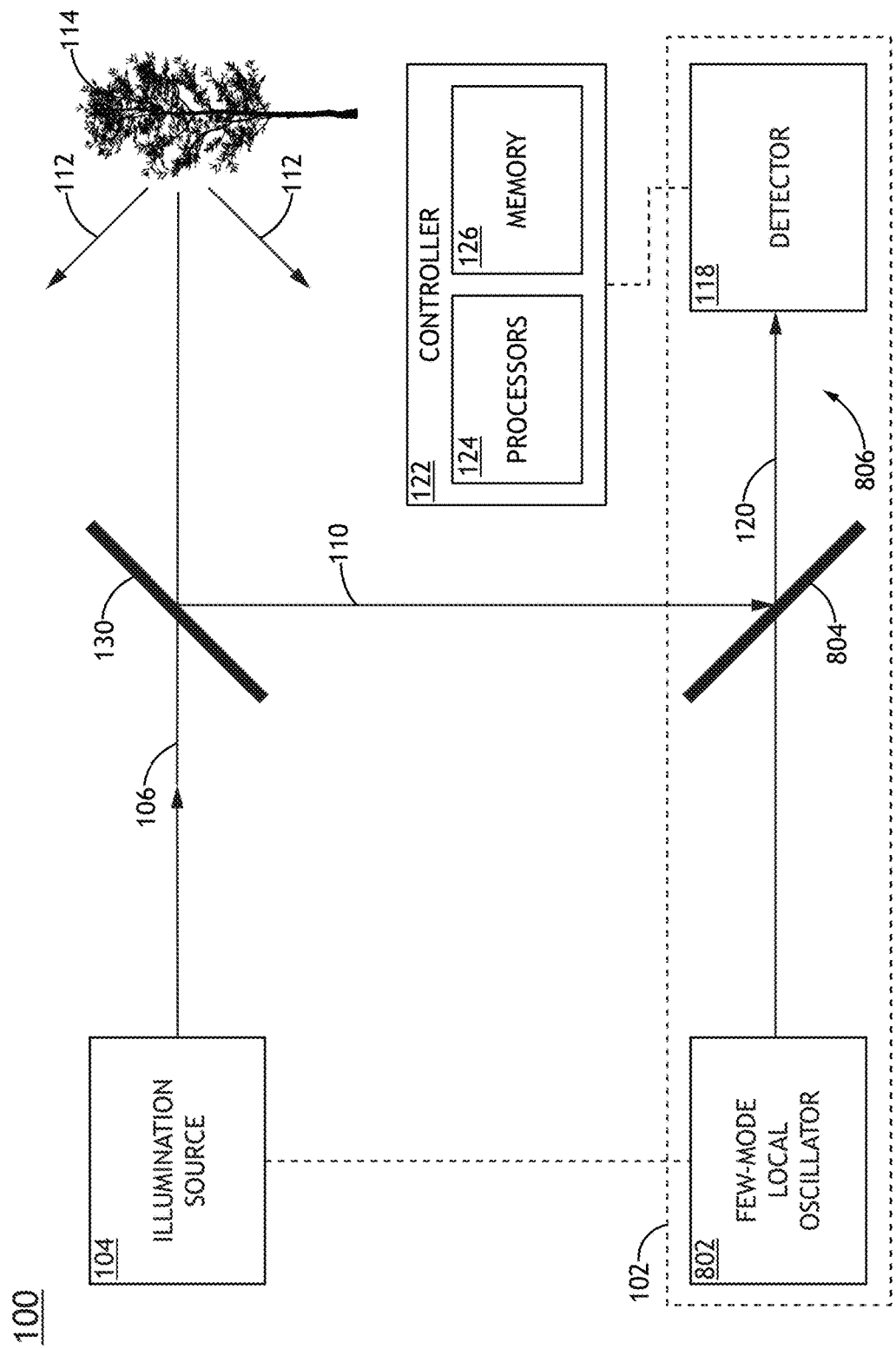
FIG. 8A is a conceptual view of a LIDAR system including a few-mode optical amplifier suitable for ranging using coherent amplification and detection, in accordance with one or more embodiments of the present disclosure.

FIG. 8A is a conceptual view of a LIDAR system 100 including a few-mode optical amplifier 116 suitable for ranging using coherent amplification and detection, in accordance with one or more embodiments of the present disclosure.

In one embodiment, the few-mode optical amplifier 116 includes a few-mode local oscillator (LO) 802 including a light source with two or more spatial modes, where light associated with each of the two or more spatial modes has a different mode-specific reference frequency. Further, the few-mode LO 802 may be synchronized with the illumination source 104 such that the phases of light in each spatial mode of the few-mode LO 802 are phase coherent with the illumination beam 106. The few-mode optical amplifier 116 may additionally include a beam combiner 804 to combine light from the few-mode LO 802 and the multi-mode return light 112 to a common optical path 806 incident on the detector 118.

In this configuration, the few-mode optical amplifier 116 coupled with the detector 118 together operate as an optical heterodyne receiver, where various spatial modes of the return light 112 coherently mix with associated spatial modes in the few-mode LO 802. Accordingly, each spatial mode the return light 112 mixed with a corresponding spatial mode of the few-mode LO 802 may be coherently amplified. Further, the total signal strength of the output will be representative of the combined intensities of each coherently-amplified spatial mode of return light 112.

The few-mode LO 802 may include any type of frequency-modulated light source containing multiple spatial modes. In one embodiment, the few-mode LO 802 includes two or more phase-synchronized light sources. In another embodiment, the few-mode LO 802 includes one phase-synchronized few-mode light source. In a general sense, few-mode LO light may be produced by a portion of the illumination source 104 or by an independent phase-synchronized light source.

Figure 8B:
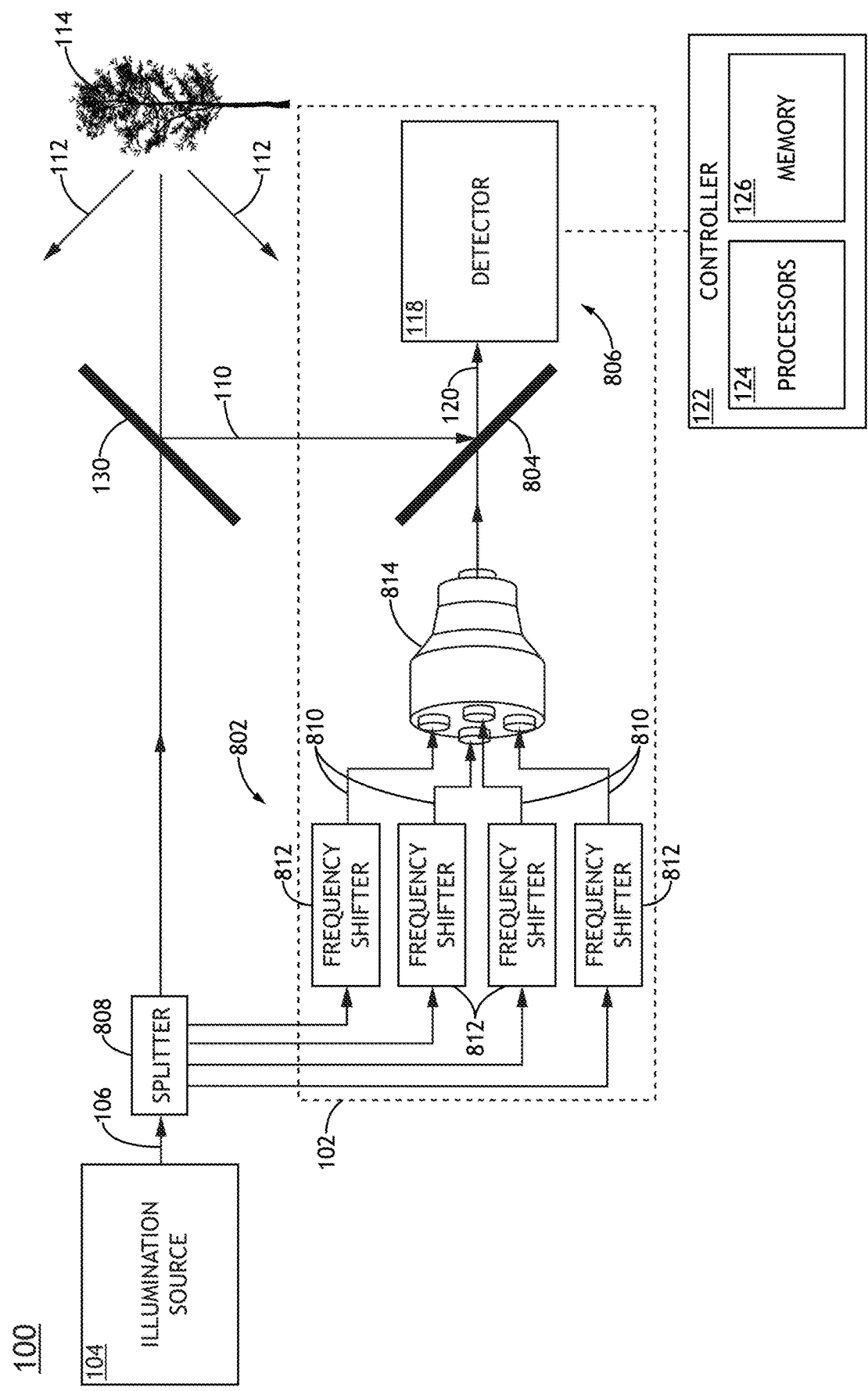
FIG. 8B is a conceptual view of a LIDAR system including a few-mode optical amplifier with a few-mode LO based on frequency-shifted portions of the illumination beam, in accordance with one or more embodiments of the present disclosure.

FIG. 8B is a conceptual view of a LIDAR system 100 including a few-mode optical amplifier 116 with a few-mode LO 802 based on frequency-shifted portions of the illumination beam 106, in accordance with one or more embodiments of the present disclosure. As illustrated in FIG. 8B, the few-mode optical amplifier 116 may include one or more splitters 808 (e.g., beamsplitters) to split the illumination beam 106 into several beams. For example, one portion (e.g., one beam) of the illumination beam 106 may be directed or scanned in a portion of the field of view 108, while other portions are retained as multiple LO channels 810. The few-mode LO 802 may also include one or more frequency shifters 812 configured to shift the optical frequency of one or more corresponding LO channels 810 such that each LO channel 810 may have a different mode-specific reference frequency. The few-mode LO 802 may further include and one or more mode multiplexers 814 to combine the light from the multiple LO channels 810 along the common optical path 806 for mixing with the multi-mode return light 112. Since each spatial mode of the few-mode LO 802 includes a different mode-specific reference frequency, the output electrical signal from the detector 118 includes a unique difference frequency (e.g., beat frequencies, intermediate frequencies, or the like) associated with each spatial mode the return light 112 mixed with a corresponding spatial mode of the few-mode LO 802.

The one or more frequency shifters 812 may include any combination of components suitable for shifting the optical frequency of light such as, but not limited to, an electro-optic modulator, an acousto-optic modulator, a nonlinear optical element, or a movable mirror configured to shift the optical frequency of incident light based on a Doppler shift. Further, the one or more mode multiplexers 814 may include any combination of components suitable for directing light from multiple sources along the common optical path 806 with different spatial modes. For example, the one or more mode multiplexers 814 may include, but are not limited to, a photonic lantern or a combination of beam splitters, beam combiners, phase masks, amplitude masks, and/or waveplates. By way of another example, the one or more mode multiplexers 814 may include a light converter configured to address various spatial modes by combining multiple spots (e.g., a multi-spot converter) or multiple phase-planes of light (e.g., a multi-plane converter).

A LIDAR system 100 including a few-mode optical amplifier 116 with a few-mode LO 802 may be suitable for various LIDAR techniques in which any combination of the optical frequency, phase, and/or amplitude of the illumination beam 106 are modulated.

In one embodiment, the illumination source 104 of a LIDAR system 100 suitable for FMCW LIDAR may include a FMCW illumination source 104, where an optical frequency of the illumination beam 106 is modulated with a selected modulation pattern. In particular, a LIDAR system 100 suitable for FMCW LIDAR may be, but is not required to be, configured as illustrated in FIG. 8B, where the illumination source 104 is a FMCW illumination source 104. Further, the FMCW illumination source 104 may modulate the optical frequency of the illumination beam 106 with any selected modulation pattern. For example, the modulation pattern may include a linear ramp of the optical frequency, but is not limited to, a saw-tooth pattern or a triangle wave pattern. In this case, mixing the return light 112 from a static remote object 114 with a LO channel 810 may generate a difference frequency that is related to the time delay $\tau_d$ (and thus the range) and the mode-specific frequency shift associated with the respective LO channel 810. However, it is to be understood that additional modulation patterns used to generate various types of LIDAR data are within the spirit and scope of the present disclosure.

The FMCW illumination source 104 may include any type of optical source known in the art suitable for providing a frequency-modulated illumination beam 106, including a commercially-available source, a custom-built source, or a combination thereof. For example, the FMCW illumination source 104 may include one or more internal components to directly generate a frequency-modulated illumination beam 106. By way of another example, the FMCW illumination source 104 may include a constant-frequency illumination source (e.g., an illumination source providing an unmodulated illumination beam 106) coupled to an optical modulator such as, but not limited to, an electro-optic modulator or an acousto-optic modulator.

Additionally, it is to be understood that the few-mode optical amplifier 116 may be formed from any combination of free-space and fiber-based optical components without departing from the spirit and scope of the present disclosure. For example, components such as, but not limited to, the one or more splitters 808, the one or more frequency shifters 812, the one or more mode multiplexers 814, or the beam combiner 804 may be fiberized or fabricated on a chip. Further, the LIDAR system 100 may include additional optical components including lenses or the like to couple and/or direct the light to or from fiberized or on-chip components.

In one embodiment, the difference frequency may be determined by performing a cross-correlation between the detection signal and a reference signal including the difference frequencies associated with each LO channel 810 associated with the output electrical signal from the detector 118. In this regard, all of the spatial modes may be analyzed simultaneously.

Figure 9:
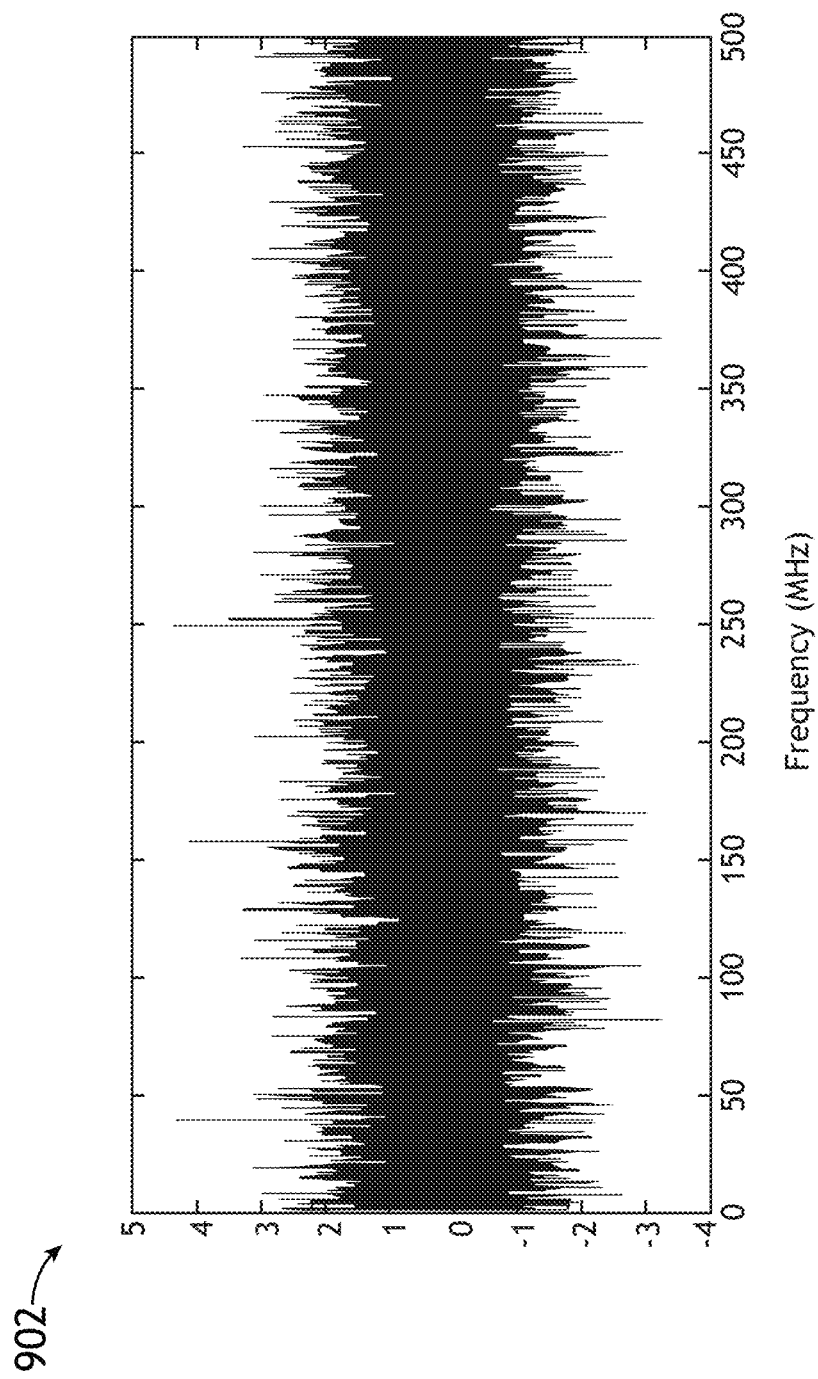
FIG. 9 is a plot illustrating an output electrical signal from a detector as a function of frequency, in accordance with one or more embodiments of the present disclosure.
Figure 10:
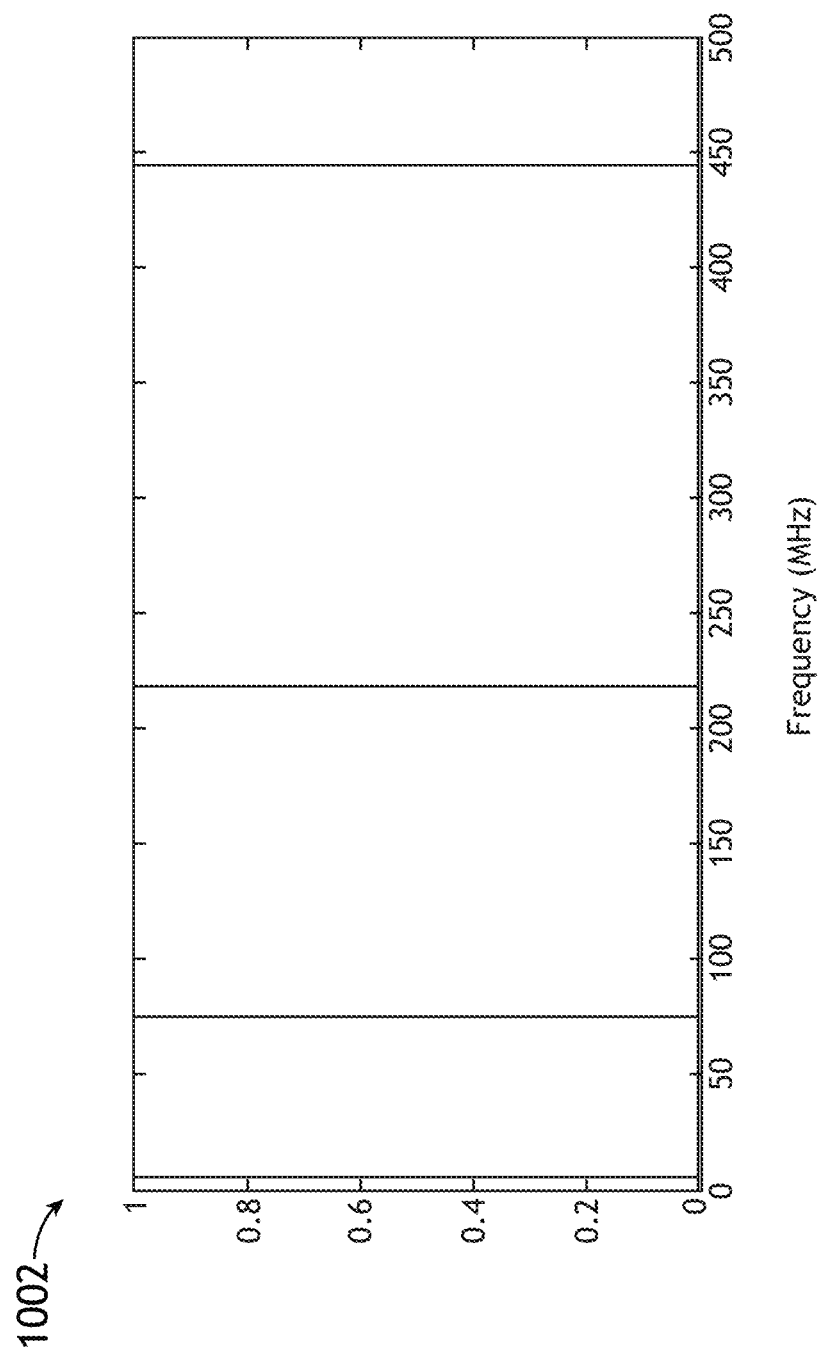
FIG. 10 is a plot of a generated reference signal as a function of frequency, in accordance with one or more embodiments of the present disclosure.

Referring now to FIGS. 9 and 10, detection and reference signals generated based on a configuration of the LIDAR system 100 in which four spatial modes are coherently amplified based on modulation with four mode-specific reference frequencies are shown in accordance with one or more embodiments of the present disclosure. In particular, FIG. 9 is a plot 902 illustrating an output electrical signal from the detector 118 as a function of frequency, in accordance with one or more embodiments of the present disclosure. FIG. 10 is a plot 1002 of a generated reference signal as a function of frequency, in accordance with one or more embodiments of the present disclosure. The reference signal in plot 1002 is generated with four frequency components corresponding to the optical frequencies of each LO channel 810 of the few-mode LO 802.

A cross-correlation between two functions $f$ and $g$ is generally defined as:

$$(f \star g)(\tau) \triangleq \int_{-\infty}^{\infty} f^*(t) g(t + \tau) dt, \quad (4)$$

where $f^*(t)$ is the complex conjugate of $f(t)$. The cross-correlation process may be characterized as sliding the two signals of interest over each other with varying delays and taking the integral at each point. Accordingly, the peak of the cross-correlation between the reference signal (e.g., shown in FIG. 10) and the detection signal based on the output light 120 incident on the detector 118 may be associated with a common difference frequency ($f_d$) associated with the round trip time delay ($\tau_d$) and thus the location of the remote object 114 as described herein.

In particular, while the primary peak of the cross-correlation signal occurs when peaks associated with all of the mode-specific frequencies in the reference signal and the detection signal overlap, additional smaller peaks may occur at delays where peaks associated with some, but not all, of the mode-specific frequencies in the reference detection signals overlap. Accordingly, considering a general case of N mode-specific frequencies, each delay associated with the correlation may fall into one of several possible conditions. In a first delay condition, none of the peaks associated mode-specific frequencies in the reference and detection signals overlap. In this case, the integral corresponds to the summation of N noises. In a second delay condition, a peak associated with one mode-specific frequency overlaps with a peak in the detection signal such that the integral corresponds to one signal of interest (e.g., one spatial mode) and N−1 noises. In a third delay condition, all of the peaks associated with the mode-specific frequencies in the reference and detection signals overlap. In this case, the integral corresponds to the sum of all of the signals of interest (e.g., all of the spatial modes) and corresponds to the round trip time delay ($\tau_d$) and thus the location of the remote object 114.

In another embodiment, the mode-specific reference frequencies of each LO channel 810 (e.g., based on the optical frequency of the illumination beam 106 and mode-specific frequency shifts introduced by the frequency shifters 812) are selected to provide a narrow peak during the cross-correlation operation to facilitate accurate ranging. For example, the mode-specific reference frequencies may be selected to provide non-uniformly spaced and/or irregular intervals to increase the likelihood that the maximum peak of the cross-correlation signal corresponds to the third delay condition above and that the maximum peak of the cross-correlation signal is narrow and well-separated from peaks associated with the other delay conditions.

Figure 11:
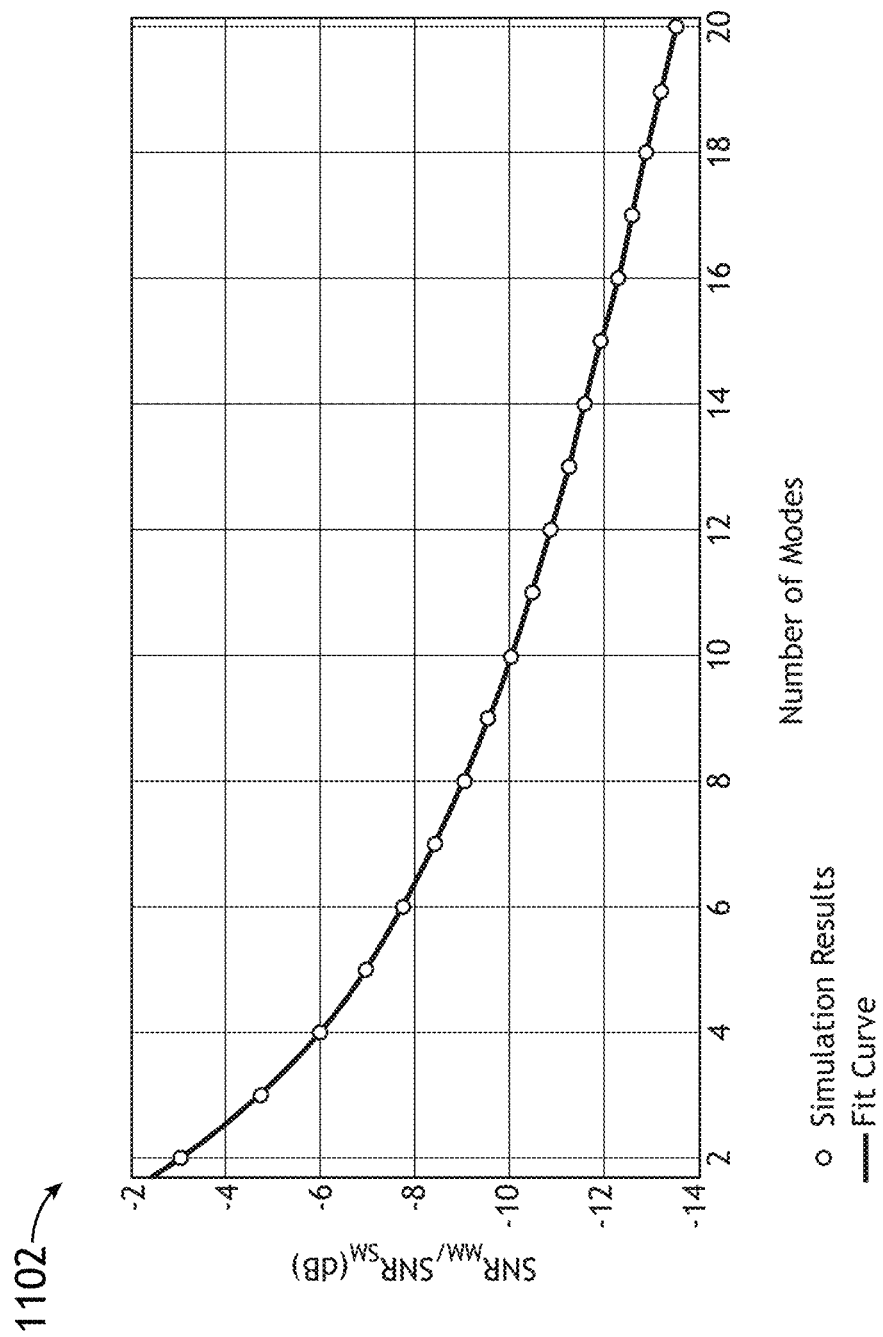
FIG. 11 is a plot of a ratio of the SNR of a few-mode LIDAR system including a few-mode optical amplifier with coherent FMCW detection relative to the SNR of a system with single mode FMCW detection, in accordance with one or more embodiments of the present disclosure.

FIG. 11 is a plot 1102 of the ratio of the SNR of a LIDAR system 100 including a few-mode optical amplifier 116 with coherent FMCW detection relative to the SNR of a system with single mode FMCW detection, in accordance with one or more embodiments of the present disclosure. As illustrated in FIG. 11, increasing the number of spatial modes collected and amplified may provide considerable SNR improvements. Further, since the SNR is generally related to the range of a LIDAR system (e.g., the minimum required SNR for a valid range measurement may be, but is not required to be, defined as the SNR providing at probability of a correct measurement of at least 90%), Further, few-mode FMCW operation as described herein may provide substantially improve range over single-mode FMCW systems.

Figure 12:
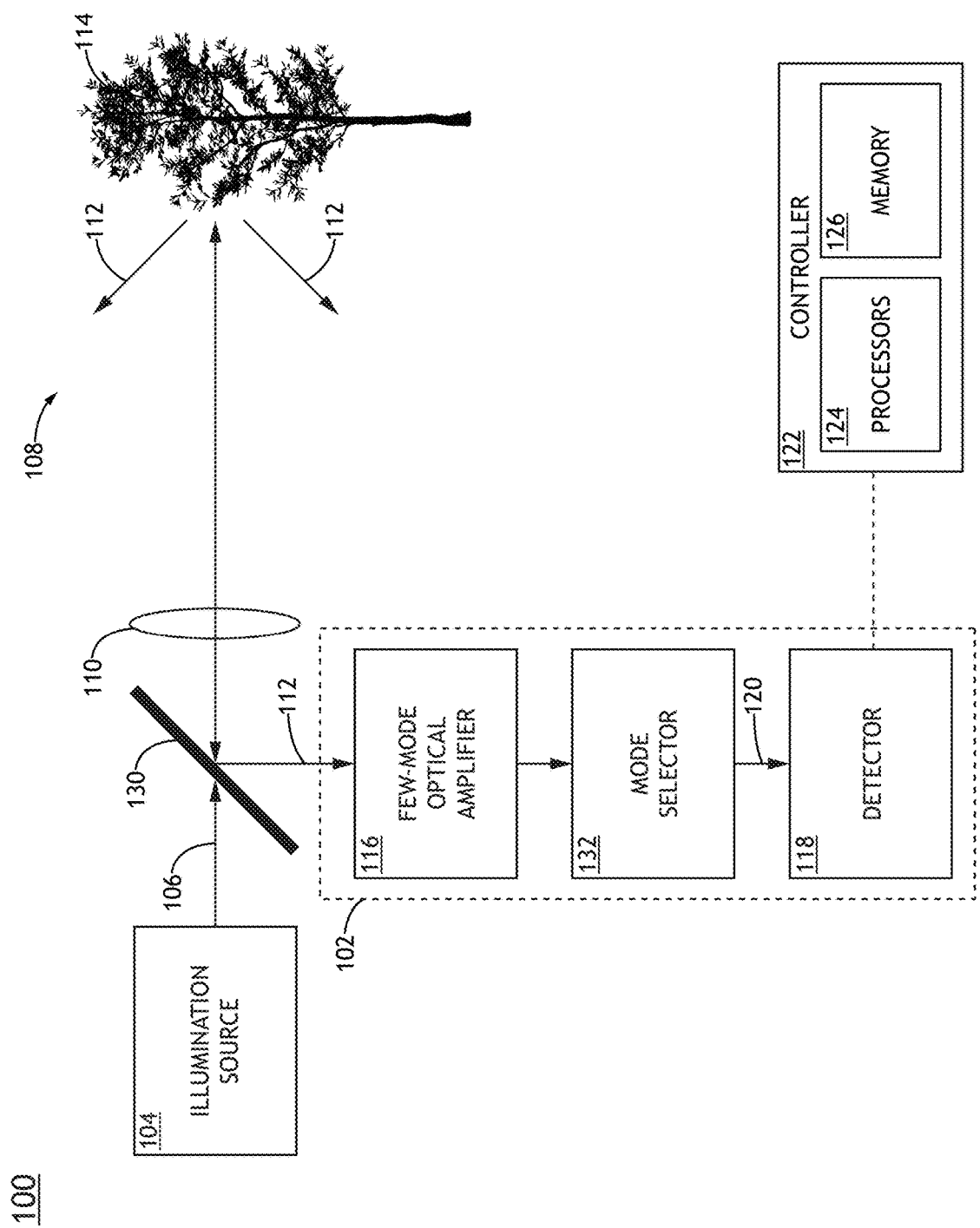
FIG. 12 is a conceptual view of a few-mode LIDAR system including a mode selector, in accordance with one or more embodiments of the present disclosure.

FIG. 12 is a conceptual view of a few-mode LIDAR system 100 including a mode selector, in accordance with one or more embodiments of the present disclosure. In some embodiments, the LIDAR system 100 may include a mode-selector 132 to adjust, control, or limit the number of spatial modes of the return light 112 collected or otherwise utilized for ranging measurements. The mode-selector 132 may be located at any point within or after the few-mode optical amplifier 116 and before the detector 118. It is recognized herein that the amount of speckle associated with the return light 112, and thus the number of spatial modes associated with the return light 112, may vary depending on measurement conditions including, but not limited to, the aperture of the collection optics 110, the operational spectrum of the illumination source 104, distance to the remote objects 114, or the roughness of the remote objects 114. Accordingly, it may be desirable to adjust the number of spatial modes amplified by the few-mode optical amplifier 116 based on an expected or actual (e.g., measured) number of spatial modes in the return light 112. It may be the case that if the return light 112 is predominantly single mode (e.g., the fundamental mode or a particular higher-order mode), a few-mode optical amplifier 116 configured for a large number of spatial modes may provide worse performance than a few-mode optical amplifier 116 configured to better match the conditions of the return light 112. For example, in the case of a few-mode optical amplifier 116 with a few-mode waveguide 302 providing optical gain, it may be desirable to limit (at least within a selected tolerance) the pump light 402 or light output by the gain medium to the particular spatial modes associated with the return light 112 and/or ASE in the few-mode waveguide 302. By way of another example, in the case of a few-mode optical amplifier 116 configured for coherent detection, it may be desirable to limit the number of spatial modes in the few-mode LO 802 to match the return light 112.

The mode-selector 132 may be formed from any components known in the art suitable for selecting, adjusting, or limiting the number of spatial modes of the return light 112. In one embodiment, the mode-selector 132 includes an adjustable aperture to limit the spatial extent of the pump light 402, the light from the few-mode LO 802, or the light output by the gain medium. In another embodiment, the mode-selector 132 includes a variable-index fiber located within or behind the few-mode optical amplifier 116. For example, the variable index fiber may include a fiber having a core with a variable refractive index. In this regard, adjusting the index of the variable-index fiber may modify the V-number and thus adjust the number of supported modes. Further, a variable-index fiber may include any type of fiber known in the art having a variable index. In one embodiment, a variable index fiber includes a filled photonic crystal fiber. For example, a variable index fiber may include a photonic crystal fiber filled with liquid crystals that may be selectively oriented to adjust the refractive index and thus the number of supported modes.

Figure 13:
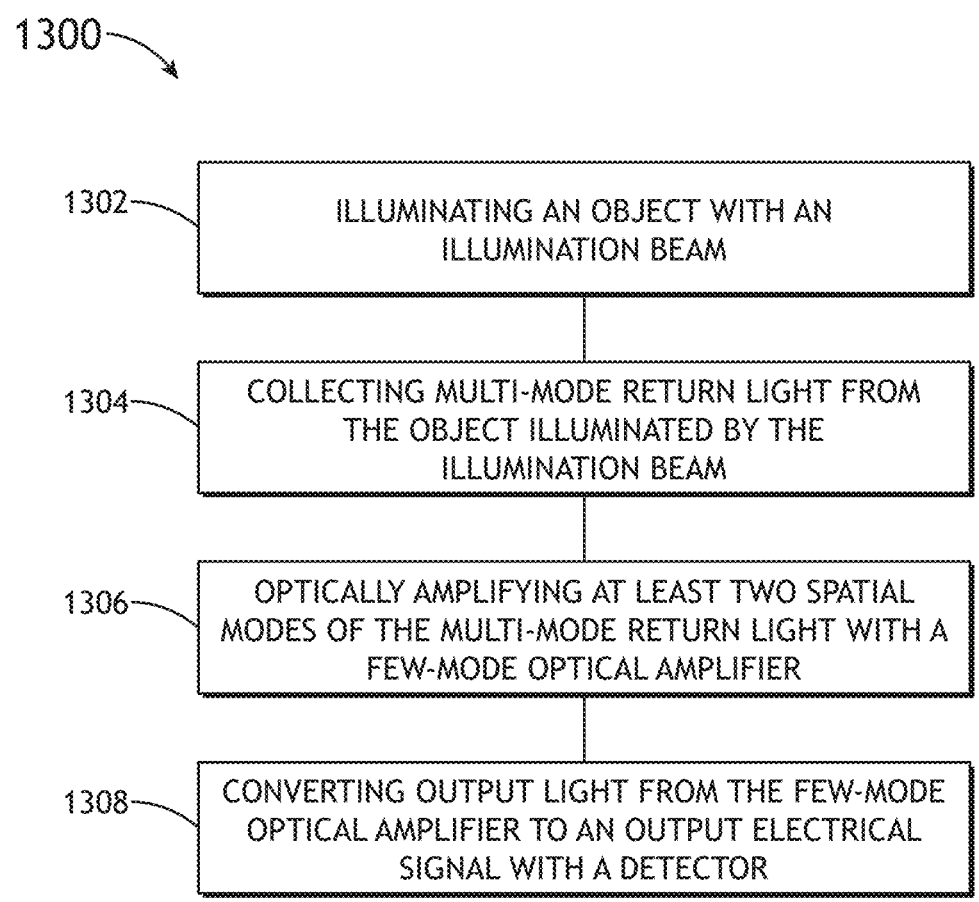
FIG. 13 is a flow diagram illustrating steps performed in a method for LIDAR using a few-mode receiver, in accordance with one or more embodiments of the present disclosure.

FIG. 13 is a flow diagram illustrating steps performed in a method 1300 for LIDAR using a few-mode receiver, in accordance with one or more embodiments of the present disclosure. Applicant notes that the embodiments and enabling technologies described previously herein in the context of the LIDAR system 100 with a few-mode receiver 102 should be interpreted to extend to the method 1300. It is further noted, however, that the method 1300 is not limited to the architecture of LIDAR system 100 with a few-mode receiver 102.

In one embodiment, the method 1300 includes a step 1302 of illuminating an object with an illumination beam. In another embodiment, the method 1300 includes a step 1304 of collecting multi-mode return light from the object illuminated by the illumination beam.

For example, step 1302 may include scanning an illumination beam 104 within at least a portion of a field of view 108 and step 1304 may include collecting return light 112 from remote objects 114 within the field of view 108. In many applications, remote objects 114 of interest (e.g., clothing, dirt, plants, animals, people, or the like) are rough. As a result, the return light 112 is diffuse and diffuse with a spatial profile characterized by a speckle pattern. In particular, the speckle pattern associated with return light in a LIDAR system includes multiple spatial modes, where the number of spatial modes may be influenced by factors such as, but not limited to, the operating wavelength, distance to the remote object, surface profile of the illuminated portion of the remote object, variations along the optical path between the LIDAR system and the object (e.g., turbulence, and the like), and the coherence of the illumination beam. Accordingly, step 1304 may include collecting the multi-mode return light 112 to provide efficient collection of relevant signals from remote objects 114.

In another embodiment, the method 1300 includes a step 1306 of optically amplifying at least two spatial modes of the return light 112 using a few-mode optical amplifier 116. In another embodiment, the method 1300 includes a step 1308 of converting output light from the few-mode optical amplifier 116 to an output electrical signal with a detector.

A few-mode optical amplifier 116 may include any combination of components to optically amplify at least two spatial modes of the return light 112. In one embodiment, the few-mode optical amplifier 116 provides optical amplification through stimulated emission. For example, the few-mode optical amplifier 116 may include a few-mode waveguide 302, where at least a portion of the few-mode waveguide 302 is formed from a gain medium. Accordingly, pumping the gain medium (e.g., through optical pumping, electrical pumping, or the like) may generate a population inversion suitable for providing optical gain. Further, the few-mode optical amplifier 116 may include any architecture suitable for few-mode amplification including, but not limited to, a few-mode fiber amplifier or a few-mode SOA. In another embodiment, a few-mode optical amplifier 116 provides optical amplification through coherent mixing and detection of return light with a few-mode local oscillator 802 that is phase coherent with an illumination source generating the illumination beam. Accordingly, portions of the return light 112 corresponding to spatial modes of the few-mode local oscillator 802 may be coherently amplified and detected. Further, the few-mode local oscillator 802 may provide, but is not required to provide, unique mode-specific reference frequencies for at least some of the spatial modes. In this case, an output electrical signal generated by a detector 118 may include different frequencies for at least some of the spatial modes associated with coherent mixing of the return light 112 with the mode-specific reference frequencies.

A few-mode optical amplifier 116 may support up to approximately 100 spatial modes and may be distinguished from a conventional multi-mode amplifier that may typically support more than 100 spatial modes (e.g., sometimes multiple hundreds of spatial modes). In particular, a few-mode optical amplifier 116 may include components that limit the number of spatial modes that may be supported and/or amplified. It is recognized herein that it may be desirable to limit the number of spatial modes supported by a LIDAR receiver and that conventional multi-mode amplifiers may not be suitable for some LIDAR applications. For example, in optical amplifiers utilizing stimulated emission to provide gain, ASE may scale with the number of spatial modes supported by the amplifier such that the ASE generated in an optical amplifier supporting a high number of optical modes may counteract the benefits of capturing multiple spatial modes of return light, particularly when the number of spatial modes supported by the amplifier exceeds the number of spatial modes present in the return light. By way of another example, multi-mode waveguides used in conventional multi-mode amplifiers supporting many modes may suffer from modal dispersion and/or mode coupling. In contrast, a few-mode LIDAR receiver 102 as described herein may utilize multiple spatial modes of the return light 112 to increase signal strength, but may limit negative effects associated with many-mode amplifiers.

In some embodiments, the few-mode optical amplifier 116 may include a mode selector 128 including, but not limited to, a variable-index fiber or an aperture to selectively adjust, control, or limit the number of spatial modes of the return light 112 collected or otherwise utilized for ranging measurements. Accordingly, it may be desirable to adjust the number of spatial modes amplified by the few-mode optical amplifier 116 based on an expected or actual (e.g., measured) number of spatial modes in the return light 112. Accordingly, the method 1300 may further include adjusting the number of modes supported by the few-mode optical amplifier 116, which may be carried out by a user, a controller 122 (e.g., in response to measurements of return light 112), or a combination thereof.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A few-mode light detection and ranging (LIDAR) receiver comprising:
   one or more collection optics configured to collect return light from an object in the field of view illuminated by an illumination beam, wherein the collected return light includes a plurality of spatial modes;
   a few-mode optical amplifier configured to optically amplify at least two of the plurality of spatial modes of the return light; and
   a detector configured to convert output light from the few-mode optical amplifier to an output electrical signal.

2. The receiver of claim 1, wherein the few-mode optical amplifier supports between two and approximately 100 spatial modes.

3. The receiver of claim 1, further comprising:
   a controller including one or more processors configured to execute program instructions causing the one or more processors to determine LIDAR data based on the detection signal.

4. The receiver of claim 3, wherein the LIDAR data includes at least one of a location, a velocity, or a composition of the object.

5. The receiver of claim 1, wherein the detector comprises:
   a photodiode.

6. The receiver of claim 1, wherein the few-mode optical amplifier comprises:
   a few-mode waveguide, wherein at least a portion of the few-mode waveguide is formed from an optical gain medium; and
   a pump configured to generate a population inversion in the optical gain medium, wherein the return light propagating along the at least two of the plurality of spatial modes are amplified when propagating through the optical gain medium.

7. The receiver of claim 6, wherein the few-mode waveguide comprises:
   a few-mode fiber.

8. The receiver of claim 7, wherein the few-mode fiber comprises:
   a few-mode fiber, wherein at least a portion of the few-mode fiber is doped with one or more rare earth elements.

9. The receiver of claim 6, wherein the few-mode waveguide is formed on a semiconductor chip, wherein the few-mode waveguide and the pump source form a semiconductor optical amplifier.

10. The receiver of claim 1, further comprising:
    a spectral filter between the few-mode waveguide and the detector to at least partially block amplified spontaneous emission in the output light.

11. The receiver of claim 1, wherein the few-mode optical amplifier comprises:
    a few-mode local oscillator configured to generate light in two or more spatial modes, wherein the local oscillator is phase coherent with an illumination source generating the illumination beam, and
    a beam combiner to align the return light along a common optical path with the light from the local oscillator, wherein the return light is coherently mixed with the light from the two or more spatial-mode optical modulators on the detector.

12. The receiver of claim 11, wherein the light in each of the two or more spatial modes has a different mode-specific reference frequency.

13. The receiver of claim 12, further comprising:
    a controller including one or more processors configured to execute program instructions causing the one or more processors to:
    generate a reference signal including difference frequencies associated with coherent mixing of the return light with the different mode-specific reference frequencies of the few-mode local oscillator; and
    determine LIDAR data based on a cross-correlation of the output electrical signal from the detector with the reference signal.

14. The receiver of claim 13, wherein the controller is configured to determine LIDAR data based on the a cross-correlation of the detection signal with the reference signal by:
    generating the cross-correlation signal by performing a cross-correlation operation between the detection signal and the reference signal, where a delay corresponding to a maximum peak of the cross-correlation signal corresponds to a time of flight delay associated with the object; and
    determining the LIDAR data based on the time of flight delay.

15. The receiver of claim 11, wherein the few-mode local oscillator comprises:
one or more splitters to split the illumination beam into three or more channels, wherein a first channel of the illumination beam is directed by the one or more transmission optics within the field of view; and
a mode multiplexer configured to couple light from two or more additional channels of the illumination beam to the common optical path.

16. The receiver of claim 15, wherein the few-mode local oscillator further comprises:
one or more frequency shifters, wherein each of the one or more frequency shifters is configured to receive a different channel of the illumination beam, wherein each of the one or more frequency shifters is configured to shift the optical frequency of a received channel of the illumination beam by a different mode-specific frequency shift.

17. The receiver of claim 16, wherein at least one of the one or more frequency shifters comprises:
at least one of an electro-optic modulator, an acousto-optic modulator, a nonlinear material, or a movable mirror.

18. The receiver of claim 15, wherein the mode multiplexer comprises:
at least one of a photonic lantern, a multiplane light converter, a spot-based mode converter, a matched propagation-constant mode converter, or a beam combiner coupled to at least one of one or more phase masks or one or more amplitude masks.

19. The system of claim 15, wherein the few-mode local oscillator further comprises:
one or more frequency shifters, each of the one or more frequency shifters configured to receive a different channel of the illumination beam, wherein each of the one or more frequency shifters is configured to shift the optical frequency of a received channel of the illumination beam by a different mode-specific frequency shift.

20. The receiver of claim 11, wherein the illumination source comprises:
a frequency-modulated illumination source, wherein an optical frequency of the illumination beam is modulated with a selected modulation pattern.

21. The receiver of claim 11, wherein the illumination source comprises:
an amplitude-modulated illumination source, wherein an optical frequency of the illumination beam is unmodulated.

22. The system of claim 11, wherein the few-mode local oscillator comprises:
one or more splitters to split the illumination beam into three or more channels, wherein a first channel of the illumination beam is directed by the one or more transmission optics within the field of view; and
a mode multiplexer configured to couple light from two or more additional channels of the illumination beam to the common optical path.

23. The receiver of claim 1, further comprising:
a variable-index waveguide coupled to the few-mode optical amplifier, wherein an index of refraction of the variable-index waveguide is adjustable to provide a selected number of allowable spatial modes in the output light incident on the detector.

24. The receiver of claim 23, wherein the selected number of allowable spatial modes is selected based on at least one of an expected roughness of the object, a divergence of the illumination beam, a size of a beam waist of the illumination beam, an operational spectrum, a diameter of an aperture in the one or more collection optics, or a selected range of the system.

25. The receiver of claim 23, wherein the selected number of allowable spatial modes is selected based on a measured number of spatial modes in the return light.

26. A few-mode light detection and ranging (LIDAR) system comprising:
an illumination source configured to generate an illumination beam;
one or more transmission optics configured to direct at least a portion of the illumination beam within a field of view;
one or more collection optics configured to collect return light from an object in the field of view illuminated by the illumination beam, wherein the collected return light includes a plurality of spatial modes;
a few-mode optical amplifier configured to optically amplify at least two of the plurality of spatial modes of the return light; and
a detector configured to convert output light from the few-mode optical amplifier to an output electrical signal.

27. The system of claim 26, wherein the few-mode optical amplifier comprises:
a few-mode waveguide, wherein at least a portion of the few-mode waveguide is formed from an optical gain medium; and
a pump configured to generate a population inversion in the optical gain medium, wherein the return light propagating along the at least two of the plurality of spatial modes are amplified when propagating through the optical gain medium.

28. The system of claim 26, wherein the few-mode optical amplifier comprises:
a few-mode local oscillator configured to generate light in two or more spatial modes, wherein the local oscillator is phase coherent with an illumination source generating the illumination beam, and
a beam combiner to align the return light along a common optical path with the light from the local oscillator, wherein the return light is coherently mixed with the light from the two or more spatial-mode optical modulators on the detector.

29. The system of claim 28, wherein the light in each of the two or more spatial modes has a different mode-specific reference frequency.

30. The system of claim 29, further comprising:
a controller including one or more processors configured to execute program instructions causing the one or more processors to:
generate a reference signal including difference frequencies associated with coherent mixing of the return light with the different mode-specific reference frequencies of the few-mode local oscillator;
generate a cross-correlation signal by performing a cross-correlation operation between the detection signal and the reference signal, where a delay corresponding to a peak of the cross-correlation signal corresponds to a time of flight delay associated with the object; and
determine the LIDAR data based on the time of flight delay.

31. The system of claim 28, wherein the illumination source comprises:

a frequency-modulated illumination source, wherein an optical frequency of the illumination beam is modulated with a selected modulation pattern.

32. A few-mode light detection and ranging (LIDAR) method comprising:

illuminating an object with an illumination beam;

collecting return light from the object illuminated by the illumination beam, wherein the collected return light includes a plurality of spatial modes;

optically amplifying at least two of the plurality of spatial modes of the return light with a few-mode optical amplifier; and converting output light from the few-mode optical amplifier to an output electrical signal with a detector.

* * * * *